(12) United States Patent
Kane, Jr. et al.

(10) Patent No.: US 9,754,288 B2
(45) Date of Patent: Sep. 5, 2017

(54) RECOMMENDATION OF MEDIA CONTENT ITEMS BASED ON GEOLOCATION AND VENUE

(71) Applicant: Amazon Technologies, Inc., Seattle, WA (US)

(72) Inventors: Francis J. Kane, Jr., Sammamish, WA (US); Peter Thomas Killalea, Seattle, WA (US); Llewellyn J. Mason, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/537,483

(22) Filed: Nov. 10, 2014

(65) Prior Publication Data
US 2015/0066648 A1 Mar. 5, 2015

Related U.S. Application Data

(63) Continuation of application No. 13/962,809, filed on Aug. 8, 2013, now Pat. No. 8,886,584, which is a continuation of application No. 12/495,009, filed on Jun. 30, 2009, now Pat. No. 8,510,247.

(51) Int. Cl.
*G06Q 30/02* (2012.01)
*G06F 17/00* (2006.01)
*G06F 17/30* (2006.01)
*G06N 5/02* (2006.01)

(52) U.S. Cl.
CPC ........ *G06Q 30/0261* (2013.01); *G06F 17/00* (2013.01); *G06F 17/30041* (2013.01); *G06F 17/30241* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 5,583,763 A | 12/1996 | Atcheson et al. | |
| 5,986,690 A * | 11/1999 | Hendricks | H04H 20/86 348/E5.002 |
| 6,016,475 A | 1/2000 | Miller et al. | |

(Continued)

FOREIGN PATENT DOCUMENTS

| | | |
|---|---|---|
| WO | WO2009071736 A1 | 6/2009 |
| WO | WO2010112951 A1 | 10/2010 |

OTHER PUBLICATIONS

Espinoza et al, "Social and Navigational Aspects of Location-Based Information Systems", Ubicomp 2001, LNCS 2201, pp. 2-17, 2001.*

(Continued)

*Primary Examiner* — Stanley K Hill
*Assistant Examiner* — Ilya Traktovenko
(74) *Attorney, Agent, or Firm* — Lee & Hayes, PLLC

(57) ABSTRACT

Content items, such as e-books, audio files, video files, etc., may be recommended to a user based on the user's presence at a geolocation or venue. Geolocation is the geospatial location of the user, while a venue is a designated area for an activity, such as a concert hall, aircraft, waiting room, etc. The recommendations may be of content items relating to the geolocation or venue, or they may be content items being accessed by others who are, or have been, in approximately the same geolocation or venue.

20 Claims, 11 Drawing Sheets

(56) References Cited

U.S. PATENT DOCUMENTS

| | | | |
|---|---|---|---|
| 6,154,757 A | 11/2000 | Krause et al. | |
| 6,266,649 B1 | 7/2001 | Linden et al. | |
| 6,526,411 B1 | 2/2003 | Ward | |
| 6,782,370 B1 | 8/2004 | Stack | |
| 6,807,417 B2 | 10/2004 | Sallinen et al. | |
| 6,869,287 B1 | 3/2005 | Tadlock et al. | |
| 6,905,340 B2 | 6/2005 | Stansvik | |
| 6,912,505 B2 | 6/2005 | Linden et al. | |
| 6,947,922 B1 | 9/2005 | Glance | |
| 6,963,838 B1 | 11/2005 | Christfort | |
| 6,981,040 B1 | 12/2005 | Konig et al. | |
| 7,065,047 B2 | 6/2006 | Boxall et al. | |
| 7,103,848 B2 | 9/2006 | Barsness et al. | |
| 7,412,442 B1 | 8/2008 | Vadon et al. | |
| 7,428,411 B2 | 9/2008 | Zellner | |
| 7,523,191 B1 | 4/2009 | Thomas et al. | |
| 7,533,082 B2 | 5/2009 | Abbott et al. | |
| 7,542,951 B1 | 6/2009 | Chakrabarti et al. | |
| 7,552,068 B1 | 6/2009 | Brinkerhoff | |
| 7,562,185 B2 | 7/2009 | Matsuda et al. | |
| 7,636,677 B1 | 12/2009 | McGonigal et al. | |
| 7,730,216 B1 | 6/2010 | Issa et al. | |
| 7,860,895 B1 | 12/2010 | Scofield et al. | |
| 7,867,094 B1 | 1/2011 | Wisdom et al. | |
| 8,041,657 B1 | 10/2011 | Nguyen et al. | |
| 8,060,525 B2 | 11/2011 | Svendsen et al. | |
| 8,065,619 B2 | 11/2011 | Agarwal et al. | |
| 8,117,193 B2 | 2/2012 | Svendsen et al. | |
| 8,219,071 B2 | 7/2012 | Kokubo et al. | |
| 8,510,247 B1 | 8/2013 | Kane, Jr. et al. | |
| 8,666,538 B2 | 3/2014 | Deas et al. | |
| 8,977,296 B1 | 3/2015 | Briggs et al. | |
| 9,262,596 B1 | 2/2016 | Steiner et al. | |
| 2001/0037360 A1 | 11/2001 | Ekkel | |
| 2002/0004742 A1 | 1/2002 | Willcocks et al. | |
| 2002/0055089 A1 | 5/2002 | Scheirer | |
| 2002/0120635 A1 | 8/2002 | Joao | |
| 2002/0169822 A1 | 11/2002 | Packard et al. | |
| 2002/0178166 A1 | 11/2002 | Hsia | |
| 2003/0028889 A1 | 2/2003 | McCoskey et al. | |
| 2003/0046678 A1 | 3/2003 | Boxall et al. | |
| 2003/0093275 A1 | 5/2003 | Polanyi et al. | |
| 2003/0152894 A1 | 8/2003 | Townshend | |
| 2003/0210226 A1 | 11/2003 | Ho et al. | |
| 2004/0033777 A1 | 2/2004 | Farineau et al. | |
| 2004/0039593 A1 | 2/2004 | Eskandari | |
| 2004/0199527 A1 | 10/2004 | Morain et al. | |
| 2004/0201633 A1 | 10/2004 | Barsness et al. | |
| 2004/0215733 A1 | 10/2004 | Gondhalekar et al. | |
| 2005/0006154 A1 | 1/2005 | Back et al. | |
| 2005/0026131 A1 | 2/2005 | Elzinga et al. | |
| 2005/0027671 A1 | 2/2005 | Hind et al. | |
| 2005/0069849 A1 | 3/2005 | McKinney et al. | |
| 2005/0113650 A1 | 5/2005 | Pacione et al. | |
| 2005/0114694 A1 | 5/2005 | Wager et al. | |
| 2006/0020973 A1 | 1/2006 | Hannum et al. | |
| 2006/0047644 A1 | 3/2006 | Bocking et al. | |
| 2006/0136393 A1 | 6/2006 | Abbott et al. | |
| 2006/0143133 A1 | 6/2006 | Medvinsky | |
| 2006/0223508 A1 | 10/2006 | Starr et al. | |
| 2006/0266830 A1 | 11/2006 | Horozov et al. | |
| 2006/0271552 A1 | 11/2006 | McChesney et al. | |
| 2006/0271618 A1 | 11/2006 | Kokubo et al. | |
| 2007/0027852 A1 | 2/2007 | Howard et al. | |
| 2007/0028266 A1 | 2/2007 | Trajkovic et al. | |
| 2007/0048696 A1 | 3/2007 | Blank | |
| 2007/0055926 A1 | 3/2007 | Christiansen et al. | |
| 2007/0124046 A1 | 5/2007 | Ayoub et al. | |
| 2007/0168892 A1 | 7/2007 | Brush et al. | |
| 2007/0203763 A1 | 8/2007 | Ackley et al. | |
| 2007/0204223 A1 | 8/2007 | Bartels et al. | |
| 2007/0204308 A1 | 8/2007 | Nicholas et al. | |
| 2007/0219949 A1 | 9/2007 | Mekikian | |
| 2007/0224586 A1 | 9/2007 | Massie et al. | |
| 2007/0266002 A1 | 11/2007 | Chowdhury et al. | |
| 2007/0281692 A1 | 12/2007 | Bucher et al. | |
| 2007/0299737 A1 | 12/2007 | Plastina et al. | |
| 2008/0016205 A1 | 1/2008 | Svendsen | |
| 2008/0057924 A1 | 3/2008 | Stewart | |
| 2008/0059422 A1 | 3/2008 | Tenni et al. | |
| 2008/0065507 A1 | 3/2008 | Morrison et al. | |
| 2008/0086261 A1* | 4/2008 | Robinson .............. A63F 13/12 701/532 |
| 2008/0092244 A1 | 4/2008 | Lee | |
| 2008/0140412 A1 | 6/2008 | Millman et al. | |
| 2008/0189733 A1 | 8/2008 | Apostolopoulos | |
| 2008/0195664 A1* | 8/2008 | Maharajh .......... G06F 17/30035 |
| 2008/0201206 A1 | 8/2008 | Pokorney et al. | |
| 2008/0201348 A1 | 8/2008 | Edmonds et al. | |
| 2008/0201643 A1 | 8/2008 | Nagaitis et al. | |
| 2008/0263014 A1 | 10/2008 | Garijo Mazario et al. | |
| 2008/0294584 A1 | 11/2008 | Herz | |
| 2008/0301737 A1 | 12/2008 | Hjelmeland Almas et al. | |
| 2008/0313040 A1 | 12/2008 | Rose et al. | |
| 2009/0085803 A1 | 4/2009 | Mergen | |
| 2009/0113532 A1 | 4/2009 | Lapidous | |
| 2009/0133059 A1 | 5/2009 | Gibbs et al. | |
| 2009/0150489 A1 | 6/2009 | Davis et al. | |
| 2009/0150501 A1 | 6/2009 | Davis et al. | |
| 2009/0157714 A1 | 6/2009 | Stanton et al. | |
| 2009/0157899 A1 | 6/2009 | Gagliardi et al. | |
| 2009/0164429 A1 | 6/2009 | Svendsen et al. | |
| 2009/0164641 A1 | 6/2009 | Rogers et al. | |
| 2009/0177745 A1 | 7/2009 | Davis et al. | |
| 2009/0213001 A1 | 8/2009 | Appelman et al. | |
| 2009/0216623 A1 | 8/2009 | Hendricks et al. | |
| 2009/0228126 A1 | 9/2009 | Spielberg et al. | |
| 2009/0248833 A1 | 10/2009 | Frazier | |
| 2009/0254409 A1 | 10/2009 | Kozhukh | |
| 2009/0254529 A1 | 10/2009 | Goldentouch | |
| 2009/0265750 A1 | 10/2009 | Jones et al. | |
| 2009/0271514 A1 | 10/2009 | Thomas et al. | |
| 2009/0281851 A1 | 11/2009 | Newton et al. | |
| 2010/0042702 A1 | 2/2010 | Hanses | |
| 2010/0056183 A1 | 3/2010 | Oh | |
| 2010/0076274 A1 | 3/2010 | Severson | |
| 2010/0082376 A1 | 4/2010 | Levitt | |
| 2010/0088746 A1 | 4/2010 | Kota et al. | |
| 2010/0106263 A1 | 4/2010 | Charania | |
| 2010/0121777 A1 | 5/2010 | McGonigal et al. | |
| 2010/0131455 A1 | 5/2010 | Logan et al. | |
| 2010/0146091 A1 | 6/2010 | Curtis et al. | |
| 2010/0205541 A1 | 8/2010 | Rapaport et al. | |
| 2010/0223273 A1 | 9/2010 | Schneider | |
| 2010/0251304 A1 | 9/2010 | Donoghue et al. | |
| 2010/0313161 A1 | 12/2010 | Le Chevalier et al. | |
| 2010/0333137 A1 | 12/2010 | Hamano et al. | |
| 2011/0035284 A1 | 2/2011 | Moshfeghi | |
| 2011/0060807 A1 | 3/2011 | Martin et al. | |
| 2011/0106736 A1 | 5/2011 | Aharonson et al. | |
| 2011/0320380 A1 | 12/2011 | Zahn et al. | |
| 2012/0282951 A1 | 11/2012 | Nguyen et al. | |
| 2012/0297466 A1 | 11/2012 | Li | |
| 2012/0310784 A1 | 12/2012 | Bartley et al. | |
| 2013/0046823 A1 | 2/2013 | Mitchell et al. | |
| 2013/0067357 A1 | 3/2013 | Rose | |
| 2013/0111513 A1 | 5/2013 | Gaude | |
| 2013/0144968 A1 | 6/2013 | Berger | |
| 2013/0173467 A1 | 7/2013 | Nuzzi et al. | |
| 2013/0174223 A1 | 7/2013 | Dykeman et al. | |
| 2013/0244624 A1 | 9/2013 | Das et al. | |
| 2015/0031400 A1 | 1/2015 | Tian et al. | |

OTHER PUBLICATIONS

Final Office Action for U.S. Appl. No. 12/495,179, mailed on Jul. 10, 2015, Francis J. Kane, Jr., "Reporting of Consumption Progress to Content Purveyors", 65 pages.

Office action for U.S. Appl. No. 12/495,061, mailed on Aug. 13, 2015, Kane, Jr. et al., "Content Usage Analysis and Recommendations", 58 pages.

(56) References Cited

OTHER PUBLICATIONS

Office action for U.S. Appl. No. 13/461,244 mailed on Sep. 11, 2015, Goodspeed et al., "Location-Based Interaction with Digital Works", 21 pages.
Office action for U.S. Appl. No. 12/495,351, mailed on Sep. 16, 2015, Kane et al., "Collection of Progress Data", 3 pages.
Office Action for U.S. Appl. No. 12/495,256, mailed on Jan. 12, 2015, Francis J. Kane, Jr., "Recommendations Based on Progress Data", 21 pages.
Final Office Action U.S. Appl. No. 12/570,690, mailed on Mar. 12, 2015, Hilliard B. Siegel, "Dynamic Access to Content Items Based on Venue", 86 pages.
Office Action for U.S. Appl. No. 13/461,244, mailed on Mar. 16, 2015, Joshua M. Goodspeed, "Location-Based Interaction with Digital Works", 18 pages.
U.S. Appl. No. 12/495,009, filed Jun. 30, 2009, Frances J. Kane, Jr., et al., "Recommendation of Media Content Items Based on Geolocation and Venue".
"Boeing couldn't make a business out of in-flight Internet. AirCell bets it can." Alsever, Jennifer, <<http://money.cnn.com/2007/11/19/smbusiness/wi-fi.fsb/index.htm>>, available as early as Nov. 28, 2007, 2 pages.
"Boeing Selects ScreamingMedia to Supply Online Content to Airborne Travelers", ScreamingMedia Inc., <<http://web.archive.org/web/20010509195703/www01.screamingmedia.com/en/about__us/pr . . . received on Apr. 14, 2009, 2 pages.
"Boeing Signs With ScreamingMedia for In-Flight Web Access" by Tischelle George, Information Week, <<http://www.informationweek.com/news/showArticle.jhtml?articleID=6505757>> available as early as May 7, 2001, 1 page.
Brunato, et al., "A Location-Dependent Recommender System for the Web", Technical report DIT-02-0093, Universita Trento, Nov. 2002, pp. 1-8.
Cataldo, "LS on basic and advanced services examples", Technical Specification Group Services and System Aspects Meeting #11, Palm Springs, CA, USA, Mar. 19-22, 2001, 11 pages.
"cyberPIXIE offers the most comprehensive solutions available in the market for your high-speed wireless LAN needs.", cyberPIXIE, Inc., <<http://web.archive.org/web/20020604074928/http://cyberpixie.com/>> available as early as May 22, 2002, 6 pages.
Espinoza et al., "GeoNotes: Social and Navigational Aspects of Location-Based Information Systems", Springer-Verlag Berlin Heidelberg 2001, Ubicomp 2001, LNCS 2201, pp. 2-pp. 17.
Hampton, "Neighborhoods in the Network Society The e-Neighbors Study", Information, Communication & Society, vol. 10, No. 5, Oct. 2007, pp. 714-748.
Johnson, "How the E-Book Will Change the Way We Read and Write", The Wall Street Journal, Apr. 20, 2009, retrieved from the internet at http://online.wsj.com/article/SB123980920727621353.html#printMode.
"KidsWatch Time Limit Parental Control Web Filtering Software", retrieved on Oct. 29, 2013 at <<http://web.archive.org/web/20081217080426/http://kidswatch.com/Time-Limit-Controls.php>>, Computer Time Limits, Webarchive, Dec. 17, 2008, 2 pages.
Lee, et al., "A time-based approach to effective recommender systems using implicit feedback", Expert Systems with Applications 34, ScienceDirect, Elsevier, vol. 34, Issue 4, May 2008, pp. 3055-3062 .
Lee, et al., "A Time-based Recommender System using Implicit Feedback", Proceeding of Proceedings of the 2006 International Conference on E-Learning, E-Business, Enterprise Information Systems, E-Government & Outsourcing, Las Vegas, Nevada, USA, Jun. 26-29, 2006, 8 pages.
Li, et al, "Mining User Similarity Based on Location History", ACM GIS '08, Nov. 5-7, 2008, Irvine, CA, USA, 10 pages.
Li et al., "Shopping Cart Abandonment at Retail Websites—A Multi-Stage Model of Online Shopping Behavior", Feb. 16, 2005, pp. 1-pp. 50.

Miura, et al., "Adequate RSSI Determination Method by Making Use of SVM for Indoor Localization", KES 2006, Part II, LNAI 4252, Springer-Verlag Berlin Heidelberg 2006, pp. 628-636.
Final Office Action for U.S. Appl. No. 12/495,256, mailed on Jan. 27,2012, Francis J. Kane Jr et al., "Recommendations Based on Progress Data", 29 pages.
Office Action for U.S. Appl. No. 12/495,256, mailed on Jan. 30, 2014, Francis J. Kane, Jr., "Recommendations Based on Progress Data", 25 pages.
Office action for U.S. Appl. No. 12/495,351, mailed on Oct. 6, 2011, Kane et al., "Collection of Progress Data", 26 pages.
Office action for U.S. Appl. No. 12/495,351, mailed on Oct. 19, 2012, Kane, Jr. et al., "Collection of Progress Data", 39 pages.
Office Action for U.S. Appl. No. 12/495,351, mailed on Oct. 21, 2014, Francis J. Kane, Jr, "Collection of Progress Data", 39 pages.
Office action for U.S. Appl. No. 12/495,061, mailed on Oct. 7, 2014, Kane, Jr., et.al., "Content Usage Analysis and Recommendations", 52 pages.
Final Office Action for U.S. Appl. No. 12/495, 009, mailed on Nov. 6, 2012, Francis J. Kane Jr. et al., "Recommendation of Media Content Items Based on Geolocation and Venue", 12 pages.
Office action for U.S. Appl. No. 12/495,061, mailed on Nov. 21, 2012, Kane, Jr. et al., "Content Usage Analysis and Recommendatins", 24 pages.
Office action for U.S. Appl. No. 12/570,690, mailed on Nov. 25, 2012, Siegel et al., "Dynamic Access to Content Based on Venue", 28 pages.
Office Action for U.S. Appl. No. 13/962,809, mailed on Nov. 8, 2013, Francis J. Kane Jr., "Recommendation of Media Content Items Based on Geolocation and Venue", 25 pages.
Non-Final Office Action for U.S. Appl. No. 12/495, 009, mailed on Feb. 13, 2012, Francis J. Kane Jr. et al., "Recommendation of Media Content Items Based on Geolocation and Venue", 35 pages.
Office action for U.S. Appl. No. 12/495,179, mailed on Feb. 21, 2013, Kane, Jr. et al., "Reporting of Content Consumption Progress to Content Purveyors", 65 pages.
Office Action for U.S. Appl. No. 12/570,690, mailed on Feb. 4, 2014, Hilliard B. Siegel, "Dynamic Access to Content Items Based on Venue", 63 pages.
Office Action for U.S. Appl. No. 12/495,061, mailed on Feb. 5, 2014, Francis J. Kane Jr., "Content Usage Analysis and Recommendations", 32 pages.
Final Office Action for U.S. Appl. No. 13/962,809, mailed on Mar. 24, 2014, Francis J. Kane Jr, "Recommendation of Media Content Items Based on Geolocation and Venue", 41 pages.
Non-Final Office Action for U.S. Appl. No. 12/495,351, mailed on Apr. 10, 2012, Kane et al., "Collection of Progress Data", 35 pages.
Non-Final Office Action for U.S. Appl. No. 12/495,179, mailed on May 24, 2012, Francis J. Kane Jr et al., "Reporting of Content Consumption Progress to Content Purveyors", 42 pages.
Non-Final Office Action for U.S. Appl. No. 12/495,061, mailed on May 24, 2012, Francis J. Kane Jr.et al., "Content Usage Analysis and Recommendations", 16 pages.
Final Office Action for U.S. Appl. No. 12/495,061, mailed on May 28, 2014, Francis J. Kane, Jr., "Content Usage Analysis and Recommendations", 31 pages.
Final Office Action for U.S. Appl. No. 12/495,256, mailed on Jun. 5, 2014, Francis J. Kane Jr., "Recommendations Based on Progress Data", 18 pages.
Office action for U.S. Appl. No. 12/570,690, mailed on Jul. 15, 2013, Siegel et al., "Dynamic Access to Content Items Based on Venue", 62 pages.
Office Action for U.S. Appl. No. 12/570,690, mailed on Aug. 22, 2014, Hilliard B. Siegel, "Dynamic Access to Content Items Based on Venue", 70 pages.
Non-Final Office Action for U.S. Appl. No. 12/495,256, mailed on Sep. 19, 2011, Francis J. Kane Jr, "Recommendations Based on Progress Data", 24 pages.
Response to Office Action dated May 24, 2012 for U.S. Appl. No. 12/495,061 as filed on Oct. 24, 2012, 16 pages.
Response to Office Action dated Nov. 21, 2011 for U.S. Appl. No. 12/495,061 as filed on Feb. 21, 2013, 19 pages.

(56) References Cited

OTHER PUBLICATIONS

Response to Restriction dated Jan. 26, 2012 for U.S. Appl. No. 12/495,061 as filed on Mar. 26, 2012, 3 pages.
Park, et al., "Location-Based Recommendation System Using Bayesian User's Preference Model in Mobile Devices", UIC 2007, LNCS 4611, Springer-Verlag Berlin Heidelberg 2007, pp. 1130-1139.
Parle, et al., "Proximo, Location-Aware Collaborative Recommender", UCD School of Conputer Science & Informatics University College Dublin, Belfield, Dublin, Ireland, 2006, pp. 1-6.
"PCTEL Acquires Wireless LAN Software and Gateway Products" PCTE:, Inc. <<http://web.archive.org/web/20020607225950/www.pctel.com/newsroom/2002/02-05-22.html>>, available as early as May 22, 2002, 2 pages.
Response to Office Action dated Nov. 6, 2012 for U.S. Appl. No. 12/495,009 as filed on Mar. 6, 2013, 15 pages.
Response to Office Action dated Feb. 13, 2012 for U.S. Appl. No. 12/495,009 as filed on Jul. 13, 2012, 26 pages.
"Wireless internet access in-flight, along with complimentary access to the Wall Street Journal, Fodors, etc. while in flight." 2009 Aircell, <<http://www.gogoinflight.com/>> received on Apr. 14, 2009, 2 pages.
Wu, et al., "Development of a tool for selecting mobile shopping site: A customer perspective", Electronic Commerce Research and Applications, ScienceDirect, Elsevier, 2006, pp. 192-20.
Yang, et al., "A location-aware recommender system for mobile shopping environments", Expert Systems with Applications 34, ScienceDirect, Elsevier, 2008, pp. 437-445.
Office action for U.S. Appl. No. 13/461,244, mailed on Dec. 17, 2015, Goodspeed et al., "Location-Based Interaction with Digital Works", 23 pages.
Office action for U.S. Appl. No. 12/570,690, mailed on Mar. 29, 2016, siegel et al., "Dynamic Access to Content Items Based on Venue", 79 pages.
Office action for U.S. Appl. No. 12/495,179, mailed on May 3, 2016, Kane Jr. et al., "Reporting of Content Consumption Progress to Content Purveyors", 78 pages.
Office Action for U.S. Appl. No. 12/495,179, mailed on Nov. 5, 2014, Francis J. Kane Jr, "Reporting of Content Consumption Progress to Content Purveyors", 60 pages.
Office action for U.S. Appl. No. 13/461,244, mailed on Jun. 29, 2016, Goodspeed et al., "Location-Based Interaction with Digital Works", 20 pages.
Office action for U.S. Appl. No. 12/495,061, mailed on Jul. 15, 2016, Kane Jr. et al., "Content Usage Analysis and Recommendations", 60 pages.
Office action for US Patent Application 12/495,179, mailed on Oct. 21, 2016, Kane Jr. et al., "Reporting of Content Consumption Progress to Content Purveyors", 84 pages.
Office action for U.S. Appl. No. 12/495,061, mailed on Nov. 16, 2016, Kane Jr. et al., "Content Usage Analysis and Recommendations", 83 pages.
Office action for U.S. Appl. No. 12/570,690, mailed on Sep. 30, 2016, Siegel et al., "Dynamic Access to Content Items Based on Venue", 86 pages.

\* cited by examiner

RECOMMENDATION OF MEDIA CONTENT ITEMS BASED ON GEOLOCATION AND VENUE

CROSS REFERENCE TO RELATED APPLICATIONS

This application is a continuation of and claims the benefit of priority to U.S. patent application Ser. No. 13/962,809, which was filed Aug. 8, 2013, which is a continuation of and claims the benefit of priority to U.S. patent application Ser. No. 12/495,009, which was filed Jun. 30, 2009, the entire contents of which are incorporated herein by reference.

BACKGROUND

A large and growing population of users is consuming increasing amounts of digital content items, such as music, movies, audio books, images, electronic books, executables, and so on. These users employ various electronic access devices to consume such content items. Among these access devices are electronic book readers, cellular telephones, personal digital assistant (PDA), portable media players, tablet computers, netbooks, and the like. As more users consume content items electronically, new opportunities to observe how users interact with content may be discovered and explored.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes an architecture and techniques in which user interaction with media content items, including the location of interaction with those content items, is tracked and analyzed. A content item may be essentially any form of an electronic media data that may be consumed on a device, such as a digital book, electronic magazines, music, movies, and so on. A content item may also be composed of multiple smaller portions, such as units, chapters, sections, pages, tracks, episodes, parts, subdivisions, scenes, intervals, periods, modules, and so forth.

Users may access and present the content items through a wide variety of access devices, such as electronic book readers, cellular telephones, personal digital assistant (PDA), portable media players, tablet computers, and so forth. With the help of these devices, metrics pertaining to how and where users interact with all or part of individual content items may be collected, aggregated, and reported. These metrics may include access statistics, such as which content items were accessed by users at a particular location.

These metrics provide insights into what content items, or portions thereof, were accessed at a given location. These insights may benefit users by providing recommendations for future items. For instance, content items pertaining to the location may be recommended, such as guide books or local musical choices. As another example, the user's location may be matched with those of other users in the area, and content items may be recommended based on similarities with these users.

Collection of these metrics as well as the resulting statistics may also improve user interaction with content items. A user may access and filter content items based on location. This may include filtering to show content items accessed by other users in the same location, or content accessed by similar users in the same location. For instance, a user could see what other users proximate to them (e.g., neighbors) are accessing. Users may also seek recommendations for locations at which they are not physically present. For example, a user who lives in Portland, Oreg., may be planning a trip to downtown Seattle and wish to see content items pertaining to Seattle, or what content items other users in downtown Seattle have accessed.

For discussion purposes, the architecture and techniques are described in an online context where the content items are retrieved from remote servers and location information is gathered via an online service. However, the concepts described herein are also applicable in other architectures where user interaction with content items is monitored and fed back for computation of user metrics. For instance, aspects described herein may be performed in an offline environment.

Data Collection and Recommendation Architecture

Figure 1:
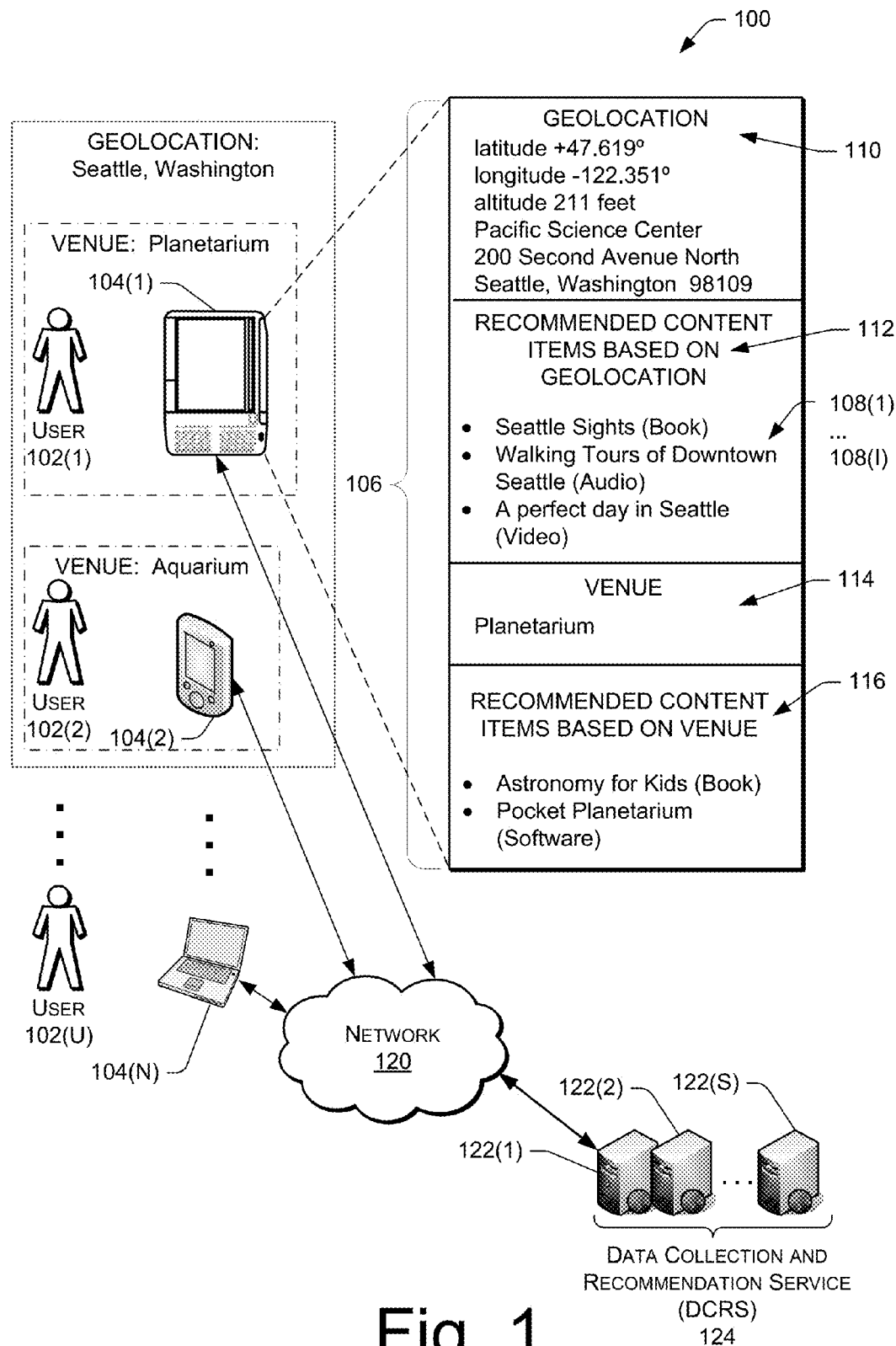
FIG. 1 is an illustrative architecture for collecting content access events and generating recommendations for media content items based on location. The architecture includes many access devices that can be used to access content items as well as a server-based data collection and recommendation service (DCRS) to track statistics pertaining to user consumption or purchase of the content items, such as the location where a content item is consumed. Location may include geolocation as well as venue. The DCRS may also generate reports and recommendations based on geolocation and/or venue.

FIG. 1 shows an illustrative architecture 100 for tracking when, where, and how users access content items. Users 102(1), ..., 102(U) are part of a population of people, which may be a defined group of users (e.g., a club or group that involves registration or subscription) or an open ended collection of users (e.g., everyone visiting a media site). The users consume a wide variety of content items, such as books, magazines, music, movies, and so on. As used in this application, letters within parentheses, such as "(U)" or "(N)", connote any integer number greater than zero.

Each representative user 102(1)-(U) employs one or more corresponding electronic access devices 104(1), ..., 104(N) to enable consumption of the content items. For instance, user 102(1) uses an electronic book ("eBook") reader device 104(1) to read digital textual material, such as electronic books, magazines, and the like. User 102(2) is using a PDA 104(2) to access content items. User 102(U) employs a laptop computer 104(N) to enjoy any number of content items, such as watching a movie, or listening to audio, or reading electronic text-based material. While these example devices are shown for purposes of illustration and discussion, it is noted that many other electronic devices may be used, such as laptop computers, cellular telephones, portable media players, tablet computers, netbooks, notebooks, desktop computers, gaming consoles, DVD players, media centers, and the like.

The users 102(1)-(U) and access devices 104(1)-(N) are located at certain geographical places. In this example, the first two users 102(1) and 102(2) are located in Seattle, Wash. The first user 102(1) is currently at the Planetarium in Seattle, while the second user 102(2) is currently at the Aquarium in Seattle. Each access device 104(1)-(N) stores or has access to one or more content items. Each device, as represented by eBook reader device 104(1), may maintain and display 106 location information and content items 108(1) ... (I).

Content items may be recommended to the users 102(1)-(U) based on geolocation, venue, or a combination of the two. Geolocation is the geospatial location of the user, such as latitude, longitude, and altitude. Venue is a designated area for an activity, such as a concert hall, museum, waiting room, aircraft, train, and so forth. A venue may not be limited to a single geolocation. For example, each particular location in a franchise may share a common venue category. Thus, the "Hard Rock Café's" restaurants may all share a common venue category of Hollywood theme restaurant. Similarly, a venue may be transitory, mobile, or both. For example, an impromptu outdoor concert, such as Woodstock, is a transitory venue. In comparison, a train coach or airplane represent mobile venues. A cruise ship offering a one-time special trip with well known comedians may be both a mobile and a transitory venue. Venues may be a specific location, such as the Science Fiction Hall of Fame in Seattle, or a category such as "museums."

In FIG. 1, the display 106 includes four different sections. A first section 110 shows geolocation information, such as latitude, longitude, altitude, any corresponding landmark or building (e.g., the Pacific Science Center), and address (e.g., 200 Second Avenue North in Seattle, Wash.). A second section 112 identifies content items that are recommended based on the geolocation. Since the geolocation is Seattle, the recommended items might include the book entitled, "Seattle Sights", or an audio book entitled, "Walking Tours of Seattle", or a video, "A Perfect Day in Seattle". A third section 114 shows a particular venue at the geolocation, such as the Planetarium at the Pacific Science Center. A fourth section 116 lists content items that are recommended based on the venue, such as the book entitled, "Astronomy for Kids" and software entitled, "Pocket Planetarium."

There are many ways to determine where consumption and/or purchase of a content item occur. For example, an electronic access device 104 may be equipped with a GPS receiver to access the global positioning system (GPS) and determine a geolocation. Alternatively, the access device 104 may be located through position information determined by a network service provider, such as a mobile carrier. Further, a location may be determined by querying the user 102. The determination of geolocation and venue is discussed in more detail below with reference to FIGS. 8 and 9.

The access devices 104(1)-(N) may be configured with functionality to access a network 120 and download content items from remote sources, such as remote servers 122(1), 122(2), ..., 122(S). Network 120 may be any type of communication network, including the Internet, a local area network, a wide area network, a wireless wide area network (WWAN), a cable television network, a wireless network, a telephone network, etc. Network 120 allows communicative coupling between access devices 104(1)-(N) and remote servers, such as network resource servers 122(1)-(S). Of particular note, individual ones of the access devices 104(1)-(N), such as eBook reader device 104(1), may be equipped with a wireless communication interface that allows communication with the servers 122(1)-(S) over a wireless network. This allows information collected by the eBook reader device 104(1) (or other access devices) pertaining to consumption of content items and location of the devices to be transferred over the network 120 to the remote servers 122(1)-(S).

The network resource servers 122(1)-(S) may store or otherwise have access to content items that can be presented on the access devices 104(1)-(N). The servers 122(1)-(S) collectively have processing and storage capabilities to receive requests for content items and to facilitate purchase and/or delivery of those content items to the access devices 104(1)-(N). In some implementations, the servers 122(1)-(S) store the content items, although in other implementations, the servers merely facilitate data collection, recommendation, access to, purchase, and/or delivery of those content items. The servers 122(1)-(S) may be embodied in any number of ways, including as a single server, a cluster of servers, a server farm or data center, and so forth, although other server architectures (e.g., mainframe) may also be used.

Alternatively, the content items may be made available to the access devices 104(1)-(N) through offline mechanisms. For instance, content items may be preloaded on the devices, or the content items may be stored on portable media that can be accessed by the devices. For instance, electronic books and/or magazines may be delivered on portable storage devices (such as flash memory) that can be accessed and played by the access devices.

Network resource servers 122(1)-(S) may be configured to host a data collection and recommendation service (DCRS) 124. Computing devices (e.g., access devices 104 as well as other computing equipment (not shown) such as servers, desktops, thin clients, etc.) may access the DCRS 124 via the network 120. The DCRS 124 collects data pertaining to user interaction with the content items, which is generally referred to as content access events. The DCRS 124 may be configured to receive such data from access devices 104, or otherwise capture data indicative of an access device's attempts to access or consume the content items (e.g., monitoring activities that may involve accessing remote servers to access and consume the content items).

The DCRS 124 may process the content access events, determine location information such as geolocation and/or venue, and generate recommendations based on the determined location. The recommendations may be generated for a particular user, or for a group of users.

Further, the DCRS 124 may provide analysis, reporting, and recommendations to users 102(1)-(U) as well as others such as content purveyors such as publishers, authors, distributors, librarians, purchasing agents, etc. The DCRS 124 can push the recommendations to users 102, or alternatively provide the recommendations in response to intentional user requests. Content purveyors may use location statistics and recommendations to select, modify, or otherwise better manage their content items 108(1)-(I) which are accessible to users 102(1)-(U) via access devices 104(1)-(N). For example, content purveyors may determine that users visiting Seattle often purchase picture books about Seattle while in Seattle, or consume travel guides while downtown.

In one example of this architecture in use, access devices 104(1)-(N) record content access events (CAEs) describing user interaction with various content items, such as electronic books. The CAEs include content item identification and location of access and consumption. The CAEs are then transferred over the network 120 to the DCRS 124 for collection and analysis.

Suppose user 102(1) is on vacation in Seattle, Wash. and decides to take her children to the Pacific Science Center in downtown Seattle. While waiting in the lobby of the planetarium at the Pacific Science Center, the user 102(1) employs her e-book reader 104(1) to find recommended content items pertaining to Seattle. The geolocation of the access device is discovered (automatically, or via user inquiry) to be Seattle, and the DCRS 124 generates recommendations of possible content items for the user to consider. These recommendations are served back to her e-book reader 104(1), where they are presented on display 106. These recommendations are based, at least in part, on data pertaining to geolocation of the e-book reader 104(1). For instance, the recommendations may include content items pertaining to geolocation or venue (e.g., Washington, King County, Seattle, Pacific Science Center, etc.). The recommendations may further include content items that have been accessed by other users while those other users are, or were, at the same geolocation or venue. Thus, in this illustrated example, several content items related to Seattle are recommended, as shown at 112 such as the book "Seattle Sights." The extent and boundaries of a geolocation may be specified, as described in more detail below with regards to FIG. 7.

In addition to geolocation in Seattle, the user 102(1) is also within a specific venue, such as the "planetarium" venue. The venue may also be discovered automatically, or in response to user inquiry. Venue, as described below with regards to FIG. 9, may be inferred or determined in several ways including use of a local token, analyzing information from the venue's local area network, correspondence with a geolocation, user query, and so on. It is further noted that the user 102(1) may be simultaneously at several venues, depending upon how the venues are specified. For example, she may be simultaneously within the planetarium venue while in the planetarium lobby, within a museum venue due to presence on the grounds of the Pacific Science Center, and within the venue of downtown Seattle. Thus, a determination of one venue is not mutually exclusive with other venues.

In comparison, the user 102(2) is using his access device 104(2) within a geolocation of Seattle, and thus may receive the recommendations for "Seattle Sights", etc. But, he is at another venue (e.g., Seattle Aquarium rather than planetarium) and thus, he receives different venue-based recommendations, such as a book titled "Fish of the World," or a video titled "Oceans of Earth."

In another implementation a user may be presented with lists, recommendations, or suggestions of content items accessed by other contemporaneous devices that are physically proximate to the user's access device. For example, the user 102(2) at the Seattle Aquarium may see that another (anonymous) user in the same exhibit gallery of the Seattle aquarium is reading "Jacque Cousteau—Pacific Explorations" while another user elsewhere at the underwater dome is listening to "Songs of the Humpback Whale."

The recommendations may be filtered prior to presentation to the user. For instance, the recommendations may be filtered based on showing only content items consumed by similar users, or by how often a content item is abandoned, or geographic proximity to the discovered location/venue. Further, content items that the user has already consumed may be filtered out (e.g., based on purchase/consumption data, or explicit instruction of the user), as well as any content items (or genres) that the user has explicitly indicated to be removed.

While this particular example is given in the context of reading books, it is noted that the example is merely for discussion purposes and not intended to be limited to books. Rather, as noted above, location of consumption or purchase may be ascertained for other content items, such as videos or music, and then be provided to the user or employed to make recommendations of other video or music selections.

Exemplary Access Device

Figure 2:
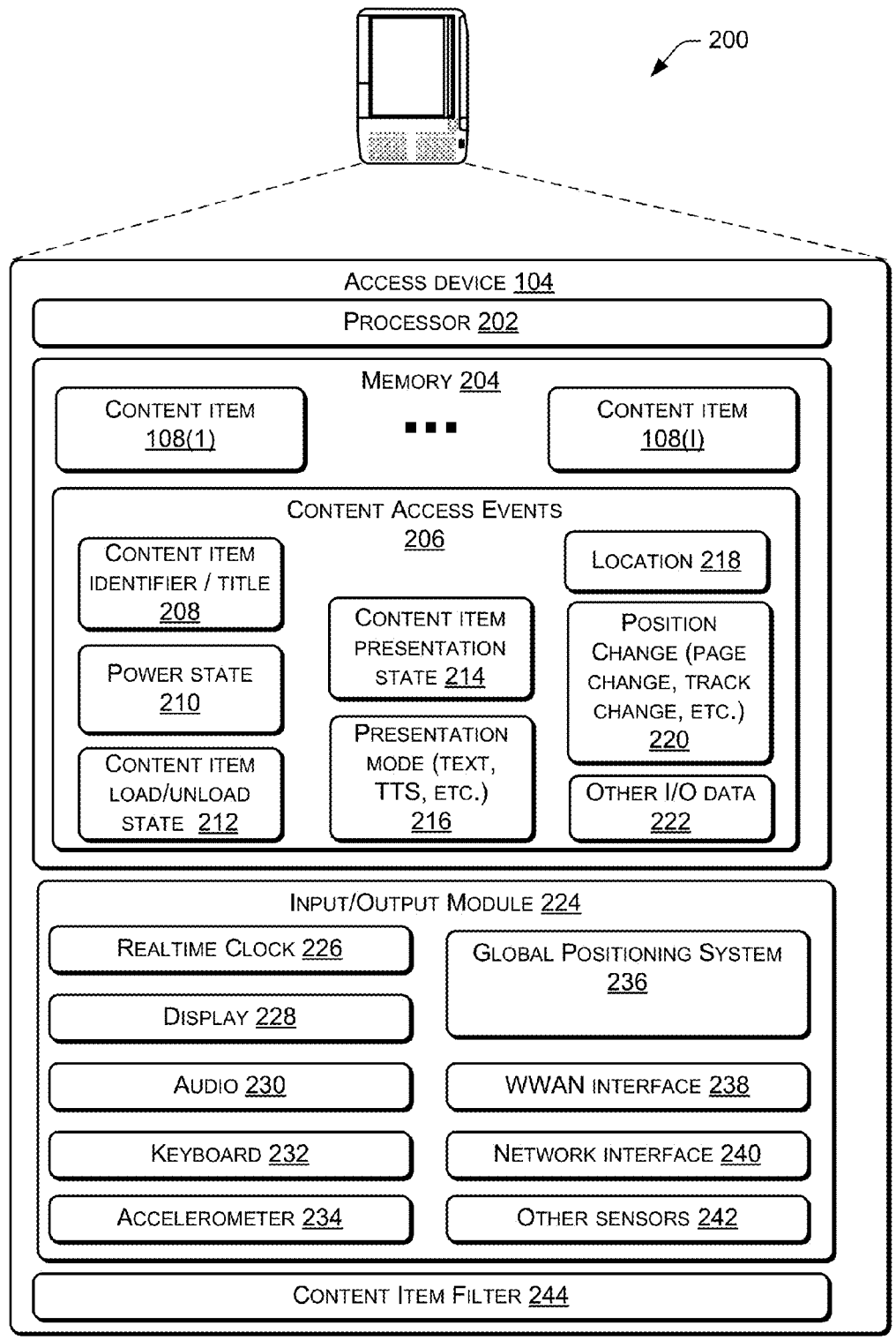
FIG. 2 is a block diagram illustrating selected modules in an access device of FIG. 1 that retrieves and presents the content items.

FIG. 2 shows selected modules 200 in an illustrative access device 104 from FIG. 1. The access device 104 includes one or more processors 202 configured to execute instructions and access data stored in memory 204. The memory 204 is representative of computer-readable storage that may be implemented as volatile and/or non-volatile memory. Content items 108(1)-(I) may be stored in the memory 204 (as shown) or otherwise accessed by the access device 104 for consumption. For example, an electronic book reader may render pages of an electronic book on a display for viewing, or an electronic player device may play audible sounds from a music track for listening.

During access of the content items 108(1)-(4 the access device generates content access events (CAEs) 206 that generally pertain to data associated with accessing the content items 108(1)-(I). The CAEs 206 may manifest as various forms of data, such as access device status, flags, events, user inputs, etc. In some implementations, the CAEs 206 may be stored in the memory 204 (as shown) and/or stored remotely (e.g., in memory of the DCRS 124). While many CAEs may be available, in some implementations only selected CAEs may be stored. In one particular implementation (as illustrated in FIG. 2), the CAEs 206 may include:

A content item identifier 208, such as title, identification number, alphanumeric string, etc.

A power state 210 that indicates which components of the access device 104 are active. For example, whether network interfaces or radios are on, off, or in sleep mode during access of a content item 108.

A load and/or unload state 212 to indicate whether a content item 108 is loaded into the memory 204. The endpoints of the load or unload may also be stored, as well as whether the user retrieved a content item 108 from external storage and stored in the memory 204, or vice versa.

A content item presentation state 214 to indicate when a content item 108 is accessed by the user for display, playback, etc.

A presentation mode 216 that specifies various modes, such as orientation of display, whether textual data was read using a text-to-speech (TTS) feature, translated, etc.

A location 218 of the access device when it accessed the content, including venue (e.g., museum, airplane, night club, etc.), specific geolocation, or both.

A position change 220 in the content item during access. For example, the user 102(1) might read every chapter of the book "Seattle Sights" in sequential order, but only listen to a few tracks from the middle of the audio tour "Walking Tours of Downtown Seattle."

Other input/output data 222 that may be captured and stored by the access device 104. For example, accelerometer data may be included to determine when the user was in motion during consumption of content.

The access device 104 further includes a set of input/output devices grouped within an input/output module 224, which may be used to provide the input/output data 222 for CAEs 206. These input/output devices in the module 224 include:

A realtime clock 226 to provide date and time. This clock may be used to compute time-based CAE, such as when a content item is accessed, or how long a user remains in a section of the content item.

A display 228 to present content items visually to the user, and optionally act as an input where a touch-sensitive display is used.

An audio device 230 to provide audio input and/or output of content items.

A keyboard 232 to facilitate user input and may include pointing devices such as a joystick, mouse, touch screen, control keys, etc.

An accelerometer 234 to generate orientation and relative motion input. For example, this may be used to determine orientation of the access device 104 during consumption of a content item.

A global positioning system (GPS) 236 to enable determination of geolocation, time data, velocity, altitude, etc. The GPS 236 may be used to generate position or location-based CAEs that may be used to help determine where user behavior occurs. For instance, such location-based CAEs may suggest whether users are more likely to consume content items when they are located in, or away from, a particular place, or perhaps on the move.

A wireless wide-area network (WWAN) 238 to provide a communication connection to a network 120. For example, WWAN may allow the access device 104 to connect to DCRS 124 while traveling.

A network interface 240 to facilitate a local wired or wireless communication connection to a network 120.

Other sensors 242, which may include ambient light level sensors, barometric pressure, temperature, user biometrics, altimeter, etc.

The access device 104 may further include a content item filter 244 configured to filter content items for presentation to the user. For example, the content item filter 244 may be configured to present content items to the user based on geolocation and/or venue, as illustrated by the various sections in the display 106 of FIG. 1.

Exemplary Server

Figure 3:
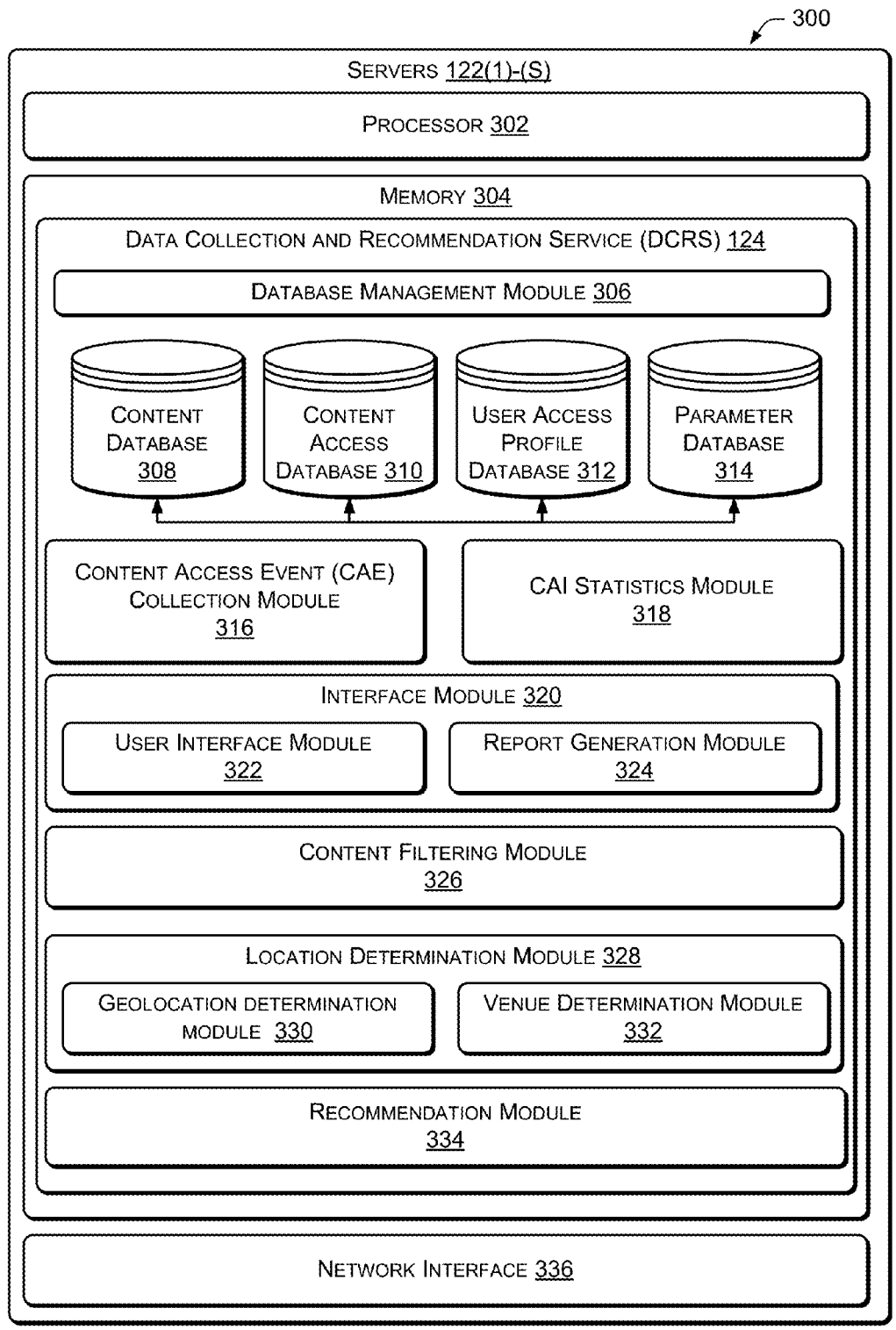
FIG. 3 is a block diagram illustrating selected modules in a server system used to host the recommendation service, as shown in the architecture of FIG. 1. The server system may also maintain or otherwise provide access to multiple databases, including a content database, customer database, user access profile database, and a parameter database.

FIG. 3 shows selected modules 300 in the system of servers 122(1)-(S) used to host the DCRS 124, as shown in the architecture of FIG. 1. The server system, referenced generally as 122, includes processors 302 that execute instructions and access data stored in a memory 304. The memory 304 implements a computer-readable storage media that may include, for example, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a processor.

Selected modules are shown stored in the memory 304. These modules provide the functionality to implement the data collection and recommendation service (DCRS) 124. One or more databases may reside in the memory 304. A database management module 306 is configured to place in, and retrieve data from, the databases. In this example, four databases are shown, including a content database 308, a content access database 310, a user access profile database 312, and a parameter database 314. Although shown as contained within the memory 304, these databases may also reside separately from the servers 122(1)-(S), but remain accessible to them. These databases 308-314, and selected items of data stored therein, are discussed in more detail below with reference to FIGS. 4-7, respectively. Also present, but not shown for clarity, may be a user database including information such as user name, age, gender, social affiliations, etc.

A CAE collection module 316 may also be stored in the memory 304. The CAE collection module 316 is configured to gather content access event data from access devices 104(1)-(N). As described above with respect to FIG. 2, the CAEs include access device status, flags, events, user inputs. For example, the CAE collection module 316 may gather a set of CAEs from access device 104(1) indicating that the book "Seattle Sights" was last displayed on screen yesterday for a period of ten minutes in a landscape presentation mode while at the Pike Street Market. Furthermore, the user only accessed seven pages of material during that time, and at the conclusion of the access, unloaded the content item from local storage on the access device 104(1). All of these factual data points may be captured as CAEs.

A content access information (CAI) statistics module 318 may be stored in memory 304 and configured to generate content access information statistics from the CAE data collected by the CAE collection module 316. Content access information is described in more detail below with respect to FIG. 5. In another implementation, the access device 104 may process CAEs to produce CAI or an intermediate data set, resulting in a smaller set of data for transmission over network 120 and/or to reduce processing load on DCRS 124.

An interface module 320 may be stored in memory 304 and configured to allow access to location information determined from content access information. Interface module 320 includes a user interface (UI) module 322 and a report generation module 324. The UI module 322 is configured to provide the user with controls and menus suitable to access the location information and recommendations.

The report generation module 324 is configured to transform location information and recommendations into user selected formats and representations.

A content filtering module 326 may reside in the memory 304 and be configured to filter content items under analysis by user specified parameters, such as those stored in the parameter database 318. For example, a user may wish to select only location statistics for a particular genre or by a particular author. Additionally, the content filtering module 326 may filter based on other factors, such as removing content items that the user has already consumed, or content items that other users have abandoned at a comparatively higher rate.

A location determination module 328 may also reside at the server system 122 and be stored in the memory 304. The location determination module 328 utilizes information collected from and about access devices 104(1)-(N) to determine location. In the illustrated implementation, the location determination module 328 is functionally composed of a geolocation determination module 330 and a venue determination module 332.

The geolocation determination module 330 determines a geospatial location of access device 104. For example, the module 330 might query a GPS in access device 104 to determine the geolocation of the access device 104. Alternatively, the module 330 may utilize information from a wireless network to approximate the location of the access device 104. One particular process for determining geolocation is described in more detail below with regards to FIG. 8.

The venue determination module 332 ascertains the venue in which the access device 104 is present. There are many ways to make this determination, including use of a local token, analyzing information from the venue's local area network, correspondence with a geolocation, user query, and so on. Determination of venue is discussed below in greater detail with respect to FIG. 9.

The server system 122 may also be configured to execute a recommendation module 334, which is shown stored in the memory 304. The recommendation module 334 is configured to provide recommendations based on results computed by the location determination module 328 and optionally filtered by the content filtering module 326. The generation of recommendations is discussed in more depth with respect to FIG. 10.

The server system 122 may also be equipped with a network interface 336, which provides a local wired or wireless communication connection to the network 120. The network interface 336 allows for communication with the access devices 104 via the network 120, as shown in FIG. 1.

Figure 4:
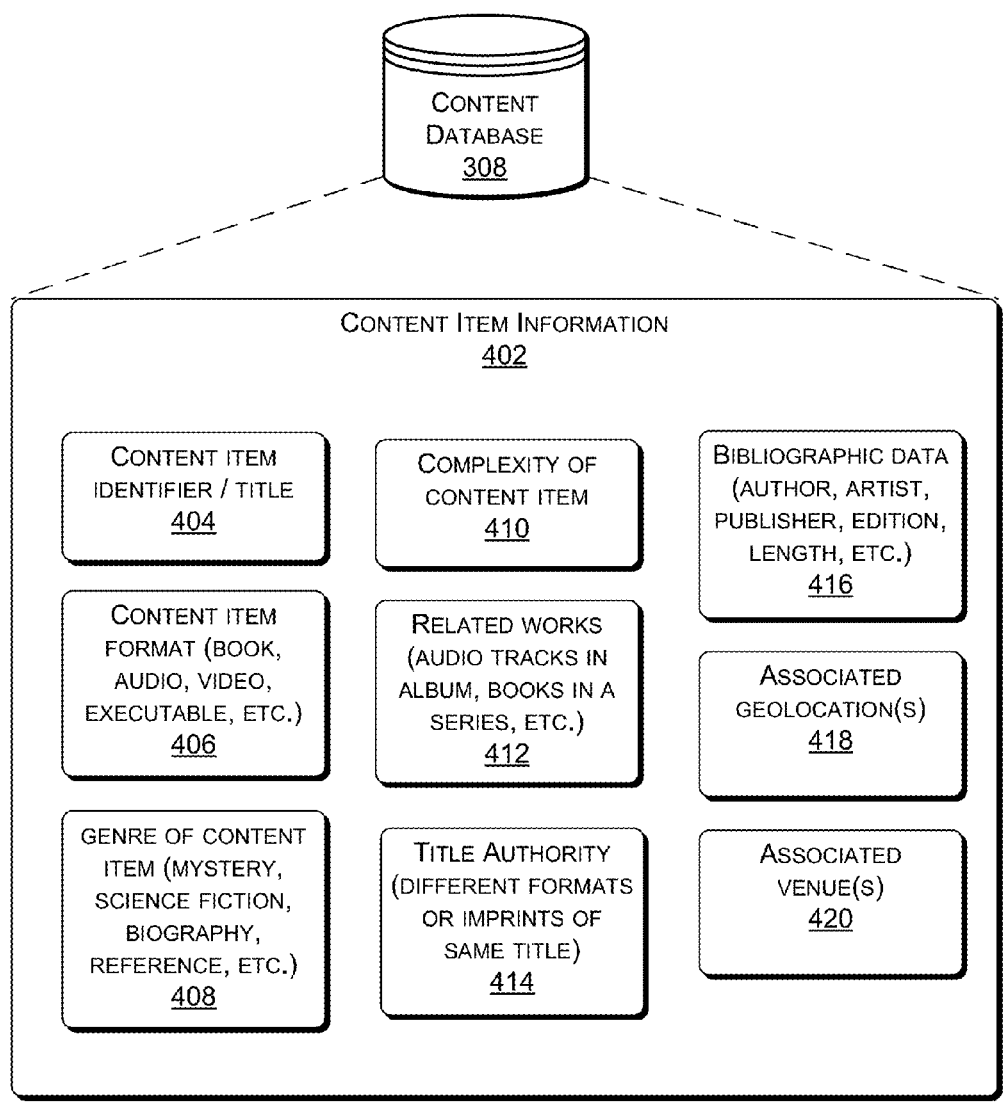
FIG. 4 shows an illustrative content database of FIG. 3, which may be used to store content items to be retrieved by the access devices.

FIG. 4 shows an illustrative content database 308 maintained at, or accessible by, the servers 122(1)-(S) of FIG. 3. The content database 308 is configured to contain content item information 402, which includes essentially any information pertaining to content items that a user may wish to access and consume. For discussion purposes, the content item information 402 may include the following:

Content item identification 404, such as title, identification number, invariant reference number, etc.

Type or content item format 406, such as whether the content item is available as a book, audio, video, executable program, etc.

Genre of content item 408, such as mystery, science fiction, biography, horror, reference, game, utility, etc.

Complexity of content item 410. For example, in textual content items, complexity may be determined from a Flesch-Kincaid Readability score, statistics based on statistically improbable phrases, or from other metrics which may be used to ascertain the relative intricacy of the content item. Complexity may also be determined from the mean and the variance of reading velocity, from the frequency of dictionary look-ups, or from a combination of these measures. Complexity of other types of content items may be determined by other suitable metrics. For example, a musical piece may have complexity determined by spectral analysis, or an executable may have complexity determined by the size of the code and number of possible user inputs during use. In another implementation, complexity may be derived from user feedback.

Related works 412, such as music tracks found in the same album, books in a series, movies by the same director, etc. Related works may also be based on behavioral relationships.

Title authority 414, which links or associates multiple instances of the same work or set of works (e.g., different formats or imprints of the same title).

Bibliographic data 416, such as author, artist, publisher, edition, length, catalog number, actors, directors, MPAA ratings, etc.

Associated geolocations 418, such as what geospatial locations the content item relates to. For example, the book "Seattle Sights" would be associated with the geolocations of Seattle, Wash., Puget Sound, etc.

Associated venues 420, such as to what venues the content item relates. For example, the book "Astronomy for Kids" may be associated with venues including planetariums, children's museums, etc. Additionally, associated venues 420 may be used to determine whether content items were sold or consumed significantly different in various locations. This can be done by matching purchase data with delivery addresses, and/or consumption data with location of consumption.

These are just some of the examples of content item information. Other items of information may further include user-applied tags, reviews, statistically improbable phases, sales rank, popularity, and so forth.

Figure 5:
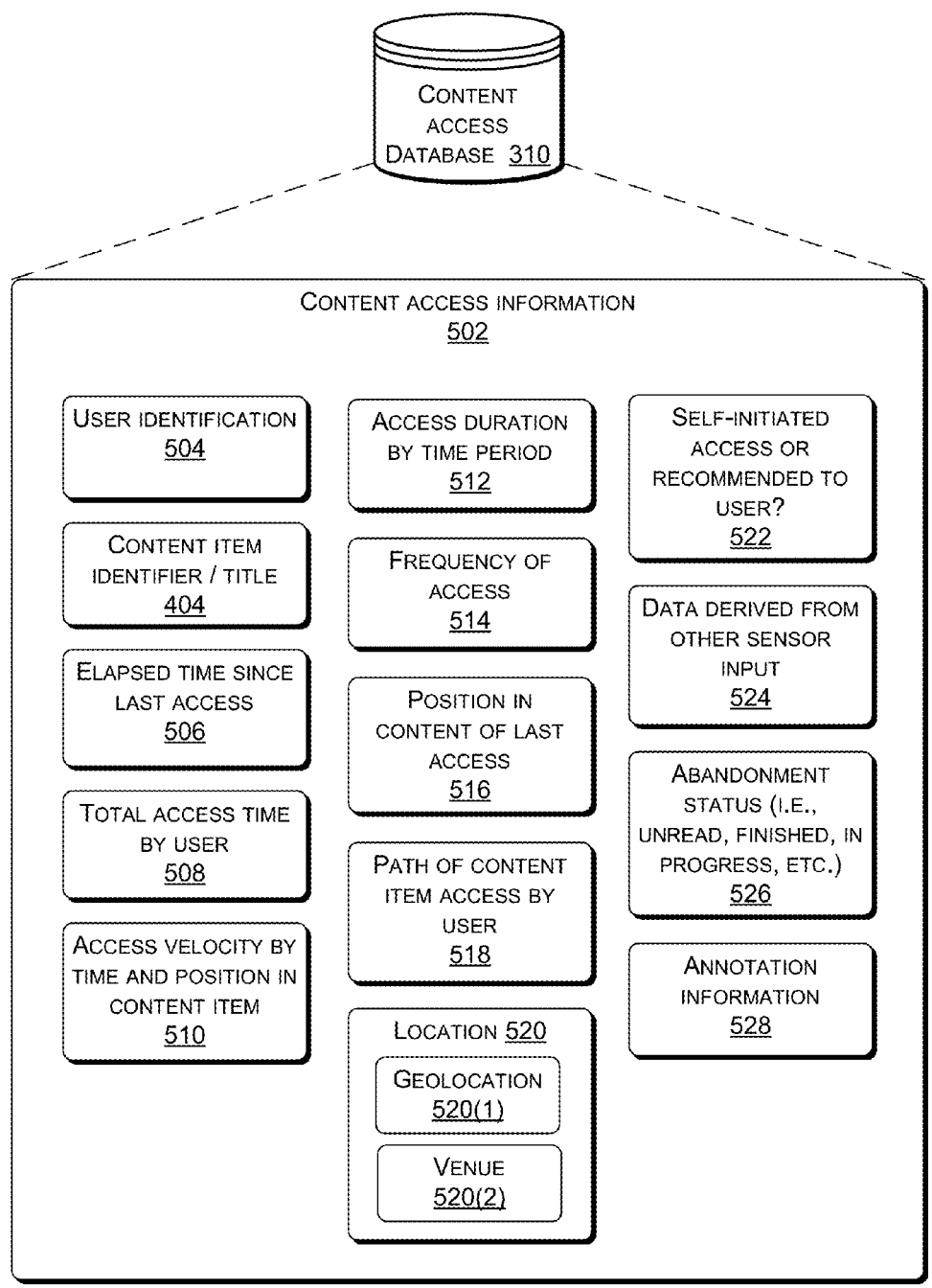
FIG. 5 shows an illustrative content access database of FIG. 3, which may be used to store content access information.

FIG. 5 shows an illustrative content access database 310 of FIG. 3, which is configured to contain content access information 502. Content access information 502 may be derived from CAEs 206. For discussion purposes, the content access information 502 may include the following:

A user identification 504, allowing association of a particular user with a particular set of content access information.

A content item identification 404, as described above.

Information element 506 pertaining to an elapsed time since last access. In one implementation, access may be defined as a user interacting with the content item such that minimum duration thresholds are exceeded. For example, access to a book may be defined as two page turns in over ten seconds, to minimize erroneous data from inadvertent interaction such as incorrectly selecting a book.

Element 508 that relates to a total access time of the content item by the user.

An access velocity (a rate of item consumption per unit time) by time and/or position in the content item 510. For example, the user read 113 words per minute in chapter 3.

An access duration by time period 512. For example, the user read for 37 minutes on April 1. This access duration by time period 512 may be for a single content item or for all content items accessed by a user during a specified time period selected.

A frequency of access 514. For example, how often a content item is accessed, how often any content item is accessed, etc.

A position in content of last access 516. For example, the last access was in chapter 5.

A path of content item access by user 518. For example, the user skipped from chapter 1 to chapter 5 then chapter 3, then switched to another book, then returned to read chapter 7.

A location 520 where the content item was accessed or purchased. Locations include specific geolocation 520 (1) such as 48.93861° N 119.435° W, venues 520(2) such as airplanes, night clubs, restaurants, etc., or both. For example, the user 102 accessed content item 108 from access device 104 which was located in Trafalgar Square.

Information element 522 directed to whether initial access to the content item was self-initiated or the result of a personal or automated recommendation to a user.

Data derived from other sensor inputs 524, such as an accelerometer or ambient light sensor. For example, accelerometer input may provide data indicating the user reads while walking. In another example, ambient light input may indicate that users spend more time reading in low light levels.

An abandonment status 526 as described above. For example, after determination of abandonment status, a content item may be flagged as abandoned.

Figure 6:
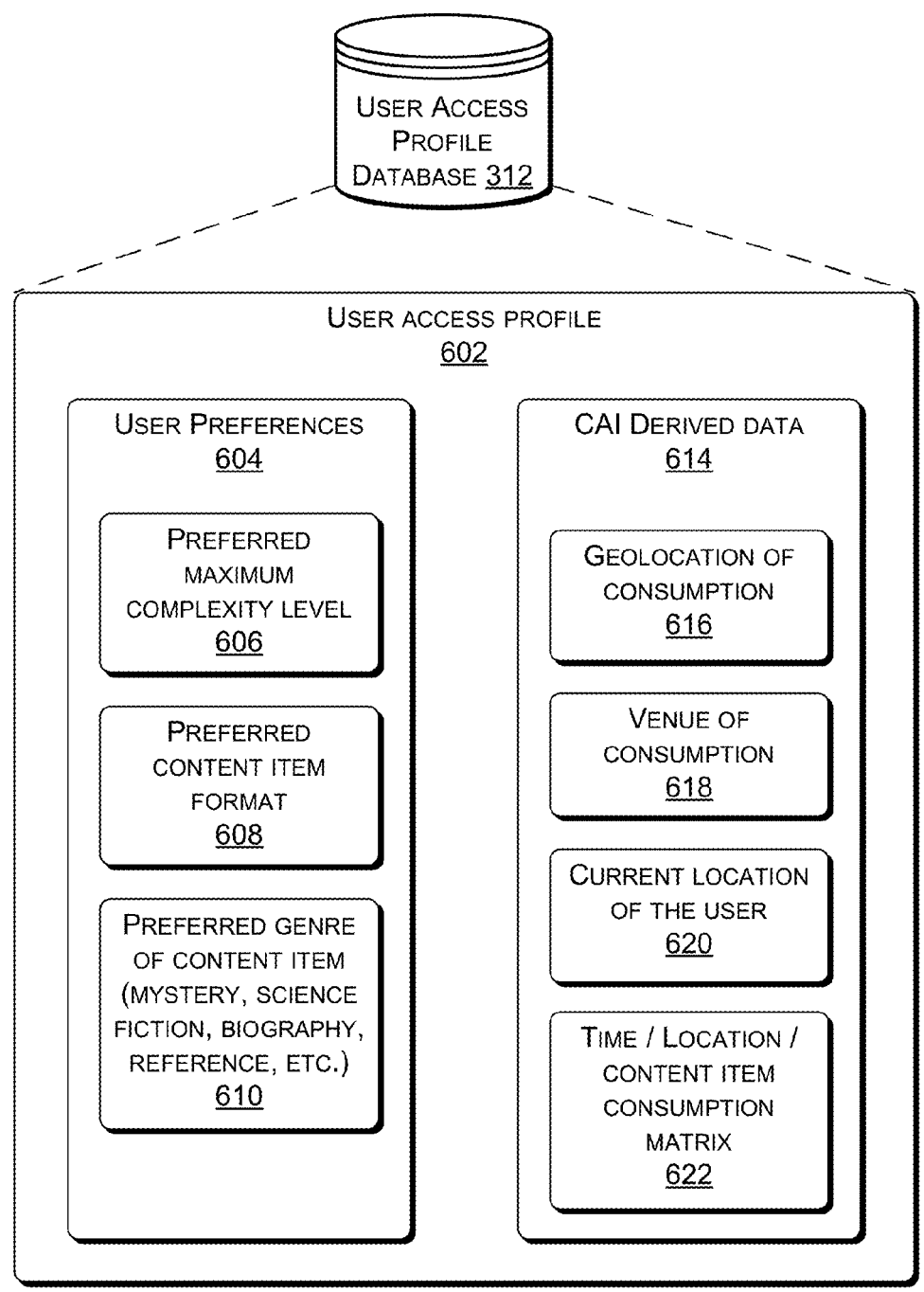
FIG. 6 shows an illustrative user access profile database of FIG. 3, which may be used to store user access profiles.

Annotation information 528, such as annotations made by users. Annotations can be in the form of notes, highlights, bookmarks, etc FIG. 6 illustrative user access profile database 312 of FIG. 3, which is configured to contain user access profiles 602 for the various users 102(1)-(U). Each user access profile 602 may include a variety of information about the user and their preferences. For discussion purposes, the user access profile 602 may include user preferences 604 which have been explicitly entered by a user or derived from other user data. These user preferences 604 may include the following:

A preferred maximum complexity level 606. For example, the user prefers content items not exceeding a grade 16 reading level.

A preferred content item format 608. For example, the user prefers to use the text-to-speech function, largest font available, etc.

A preferred genre of content items 610, such as mystery, science fiction, biography, horror, reference, etc.

The user access profile 602 may also include CAI derived data 614 which has been derived from CAEs 206. For discussion purposes, CAI derived data 614 may include the following:

A geolocation where consumption or purchase occurred 616. For example, user 102(2) consumed "Seattle Sights" while in Seattle, Wash.

A venue where consumption or purchase occurred 618. For example, user 102(2) consumed "Fish of the World" while at an aquarium.

A current location of the user 620. For example, the user 102(1) is at a planetarium venue in Seattle, Wash. In some implementations, current location may be directly queried from the access device 104.

A time/location consumption matrix 622 similar to the previous matrices. The time/location consumption matrix 620 establishes a relationship between clock time and location (such as venue or geolocation) and consumption of content. For example, between 7 a.m. to 8 a.m. the user 102(2) is on the train commuting from Bellingham to Seattle.

Figure 7:
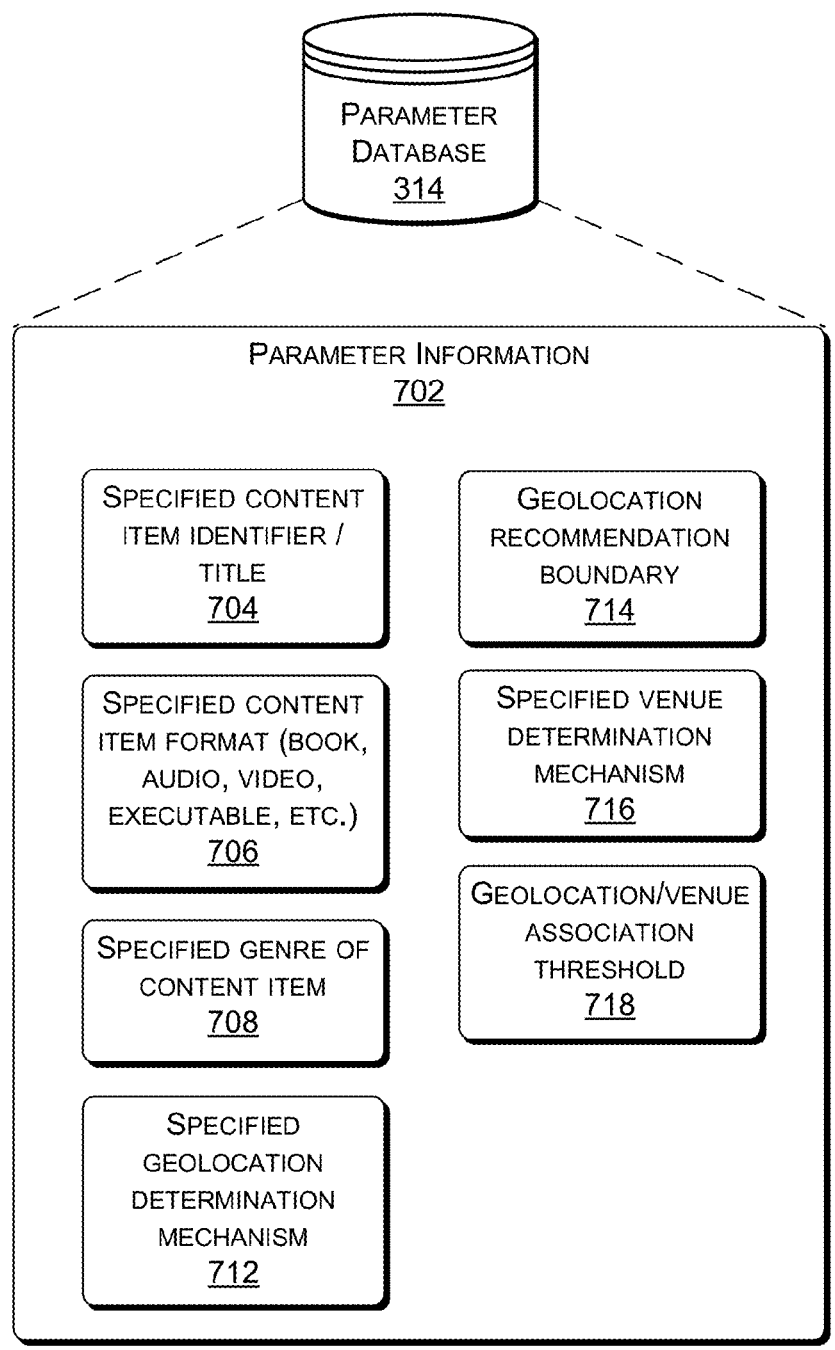
FIG. 7 shows an illustrative parameter database of FIG. 3, which may be used to store parameters used to determine location.

FIG. 7 shows an illustrative parameter database 314, which contains various parameter information 702. This parameter information 702 may be used to set thresholds, boundaries, or other mechanisms (e.g., name-value pairs) for location determination and reporting with varying scope. It is noted that thresholds are not intended to be limited to binary thresholds (e.g., exceed, not exceed), but can also encompass approximations derived from data series. At least a portion of the parameters from the parameter database may be independent between users. That is, one user may have thresholds which differ from those of another user. Such thresholds may be set by the user or inferred from their behavior. Alternatively, usage statistics may be generated with all users set to the same threshold, or combinations thereof. Parameter information 702 may include the following:

A specified content item identifier title 704. For example, a certain set of parameters may only be applied to a particular content item.

A specified content item format 706. For example, a particular set of parameters may apply to all audio content items.

A specified genre of content item 708. For example, a particular set of parameters may apply to all biographies.

A specified geolocation determination mechanism 712. For example, for a specified content item about downtown restaurants, the geolocation may be determined by a network service provider, which is considered more reliable within an urban environment. Several geolocation determined mechanisms are discussed in more detail below with regards to FIG. 8.

A geolocation recommendation boundary 714. For example, recommendations for content items about Seattle may be made when within the city limits.

A specified venue determination mechanism 716. For example, a book about "Clubs of the Seattle Underground" may have a parameter requiring use of local tokens to determine venue.

A geolocation/venue association threshold 718. For example, where the venue is determined using geolocation data, a threshold may be set as to how close the user must be to the location of the venue to be considered within the venue. Thus, because of long lines, a venue such as the planetarium may set the geolocation/venue association threshold to extend the venue to include where users line up.

In one implementation, specified geolocation mechanism 712, specified venue determination mechanism 716, or both may be configured to use the "best available" data. For example, in determining geolocation, GPS data may be preferred over positioning information providing by a network provider.

Furthermore, these parameters may be static or dynamically modified either individually or in combination. For example, parameters may be dynamically adjusted to become less stringent during holidays when users are typically vacationing, adjusted to be less stringent for highly complex material, adjusted to be highly stringent for content items assigned in an academic setting, etc.

Determining Location

Figure 8:
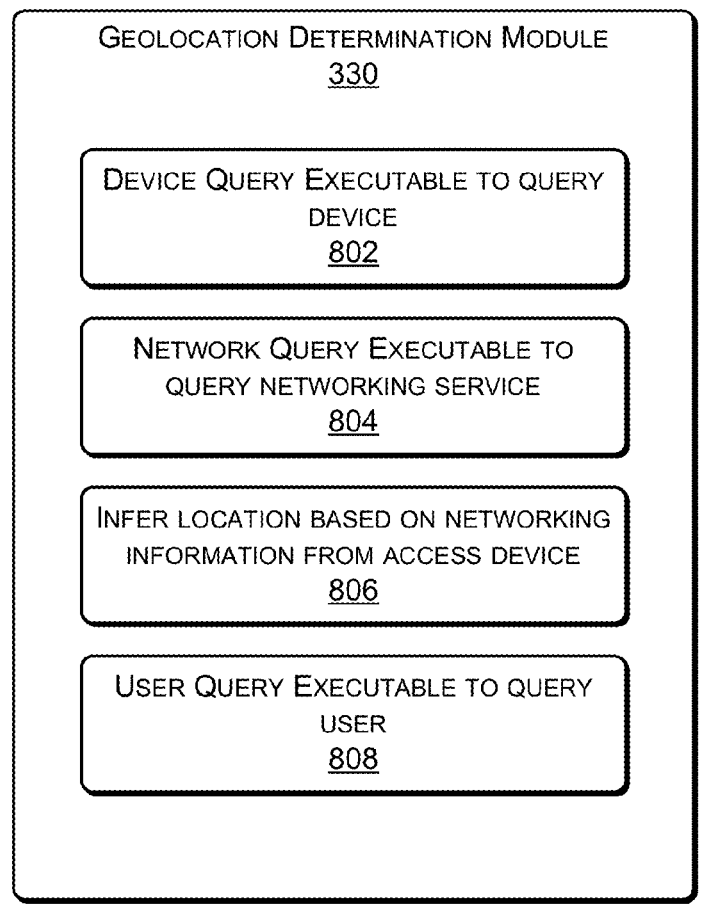
FIG. 8 shows an illustrative geolocation determination module of FIG. 3, and possible ways in which geolocation may be determined.

FIG. 8 illustrates one example implementation of the geolocation determination module 330 stored and executed as part of the data collection and recommendation service 124 in FIG. 3. Geolocation of an access device 104 may be determined by one or more of several different mechanisms.

One mechanism is a device query/response executable 802 that may be used to query the access device 104 for geolocation information. The location may be derived, for example, from the content access events captured by the access device 104 and transferred to the DCRS 124. The executable 802 may further query the access device 104 for geolocation information provided by a positioning component 236, such as GPS, Russian GLONASS, European Union Galileo, LORAN, or another system which provides geopositioning data.

Another mechanism is a network query/response executable 804 to query a networking service for geolocation information. For example, a provider of wireless wide area networking (WWAN) services for access devices 104(1)-(N) may provide geolocation data of the access device 104 derived from the access device's interaction with the WWAN, such as time delay between radio sites, geolocation of access sites, etc.

Another mechanism is an executable 806 that infers geolocation based on networking information. For example, an internet protocol address in use by the access device 104 or the internet route used to reach the access device 104 may be related to a particular geolocation. The device may have Service Location information that is configured to indicate its geolocation.

A user query/response executable 808 may also be used to ascertain geolocation information. The query/response executable 808 may present an entry UI seeking the user to explicitly input a present geolocation of the access device 104.

Figure 9:
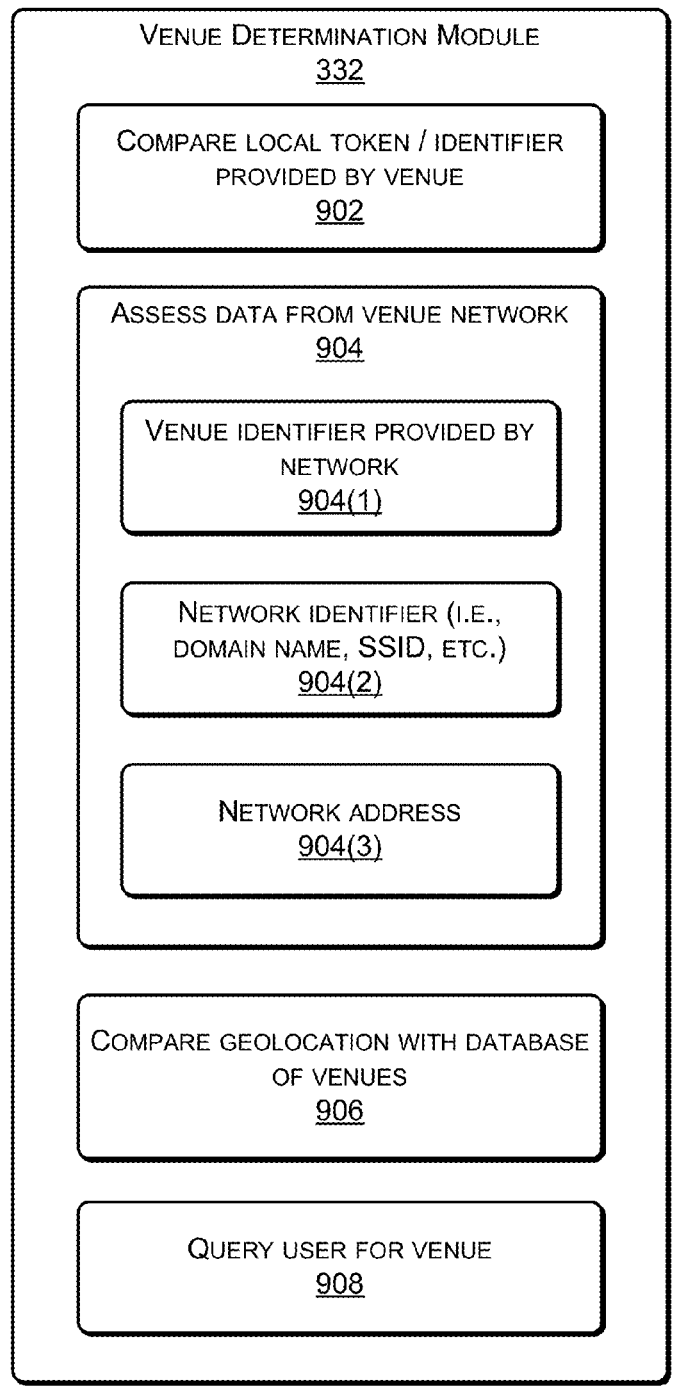
FIG. 9 shows an illustrative venue determination module of FIG. 3, and possible ways in which venue may be determined.

FIG. 9 illustrates mechanisms a venue determination module 332 of FIG. 3 may use to determine venue. These mechanisms may be supported by the venue, inferred from characteristics of the venue, or be independent of support from the venue.

A venue may support the determination of venue by providing a local token or identifier 902 to users 102. For example, an airline may provide a venue identification number on an airplane boarding pass. This venue identification number may be input into access device 104 and thus designate the current venue of the device. In another implementation, a venue may identify access devices 104 and communicate with DCRS 124 to notify the system that the identified access devices are currently within the venue.

Venue may be inferred from characteristics of the venue network, as generally provide by executable 904. There are several possible ways to infer venue. In one approach, a venue identifier 904(1) may be provided by a venue network. For example, a dynamic host control protocol (DHCP) response may include a venue identifier such as "museum." In another approach, a network identifier 904(2) may be used to determine venue. For example, a wireless network having a service set identifier (SSID) of "PACIFIC-SCIENCECTR" may be known to be associated with the Pacific Science Center in Seattle. Or an assigned domain of "accessdevice104-1.planetarium.pacscicenter.org" may be used to determine the access device is at the planetarium in the Pacific Science Center. A network address 904(3) may be used to determine venue. For example, a particular set of internet protocol addresses may be known to be used by airline-provided in-flight data services, thus indicating that the venue is an airplane. In another implementation, hardware addresses of access points, etc., may be associated with a particular venue. In yet another implementation, the device may prompt the user to tag the particular venue. This would allow the user tagged venue to be automatically associated with a geolocation or a network access point.

Venue may also be determined independently of participation by the venue. Geolocation of access device 104 may be determined as described above, and the geolocation compared with a database of venues 906. Thus, a particular set of geospatial coordinates may be associated with a particular venue, such as +47.619°, longitude −122.351° and an altitude of 211 feet corresponds to the waiting area for the planetarium. A user may also be queried 908 for the venue. In some implementations, this geolocation information and query results may be used to build or modify a database of venues.

In one implementation, venue determination may be made given a hierarchy of accuracy. For example, local tokens 902 may be considered most accurate, followed by comparison of geolocation with venue database 906, and finally assessing data from venue network 904.

Generating Recommendations

Analysis of content access events and information may lead to additional insight into consumption of content items for a given geolocation and/or venue. As discussed next, this additional analysis may result in recommendations. While described in the context of reading an electronic book, these recommendations may be applied more generally to any content item.

Figure 10:
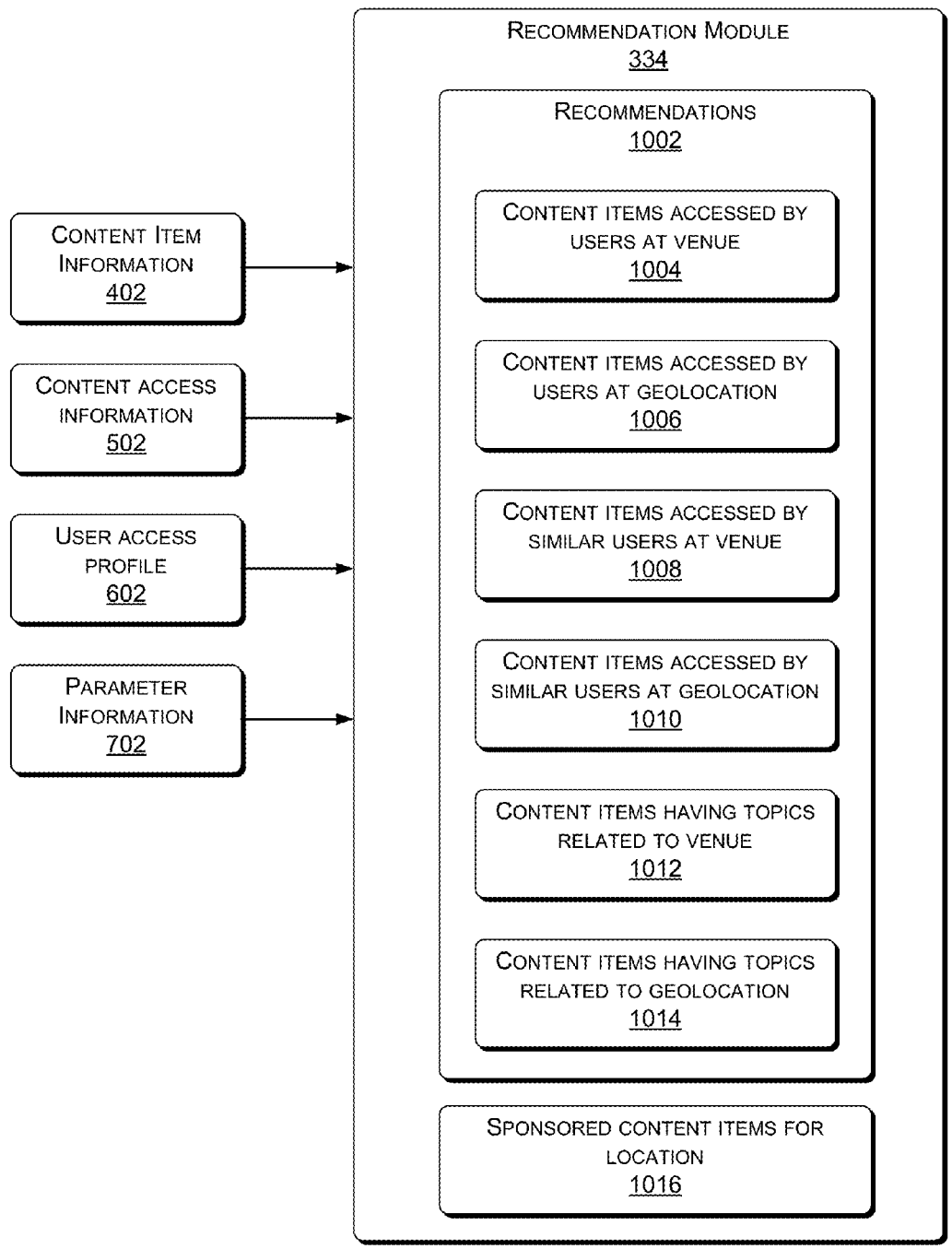
FIG. 10 shows an illustrative recommendation module of FIG. 3, and possible recommendations which may be generated.

FIG. 10 shows an illustrative recommendation module 334 that resides on the servers 122(1)-(S) as part of the data collection and recommendation service 124 as shown in FIG. 3. Various combinations of content item information 402, content access information 502, user access profile data 602, and parameter information 702 may be used by recommendation module 334 to generate recommendations 1002. From this information and data, the recommendation module 334 computes a wide variety of recommendations. The following list provides an example set of recommendations 1002 that may be produced:

Content items accessed by users at a given venue 1004. For example, a user 102(1) in the planetarium lobby would receive the recommendation that users in the planetarium venue consumed the book "Astronomy for Kids."

Content items accessed by users at a given geolocation 1006. Such recommendations may be for locations where the users currently are, or intend to be. For example, the user 102(1) in Seattle, Wash. would receive the recommendation for the book "Seattle Sights." In another scenario, recommendations may be made based on what other users within a geographical region, such as a neighborhood, may be accessing. Thus, a resident of Queen Anne neighborhood in Seattle might receive recommendations for content items that neighbors in Queen Anne neighborhood are accessing. Further, the region may be a logical region, one that is assembled based loosely on users in a region having something in common, like similar purchasing habits. Recommendations can be based on content items that are accessed more frequently by the users in the logical region as opposed to users who are not. For instance, it might be worthwhile to identify and recommend content items that are unique to a particular region as opposed to general best sellers.

Content items accessed by similar users at this venue 1008. These recommendations may be based on users exhibiting similar behaviors, or on users with similar characteristics in their user profiles. For example, should the user 102(1) be a professional astrophysicist, the user 102(1) might receive recommendations from other users with similar professional levels, such as engineers or university professors. Or, if the user 102(1) has a purchase history indicating an interest for planetary systems, recommendations may be made for content items that other people who have a similar purchase history have consumed or found interesting (perhaps even filtered for those items that the user 102(1) has not yet viewed or purchased). Additionally, content items may be identified using item-based collaborative filtering.

Content items accessed by similar users at this geolocation 1010. For example, should the user 102(2) typically consume highly technical books, the user 102(2) might receive a recommendation from similar users with technical tastes who consumed a book titled "Blue Boxing Seattle."

Content items having topics related to venue 1012. For example, "Pocket Planetarium" may be recommended to user 102(1) as being topically related to the planetarium, even if no other user 102(1)-(U) accessed this content item while in a planetarium venue.

Content items having topics related to geolocation 1014. For example, "101 Fun Things to Do in Seattle" may be a new book which has not yet been read by any user 102(1)-(U) but is topically pertinent to the geospatial location of Seattle. If this list of content items becomes large, the list can be filtered according to various factors, such as ratings, popularity, sales rank, and so forth.

In some implementations, sponsored content items or advertisements may be provided to a user based on location 1016. For example, user 102(1) may have the option to purchase "Astronomy for Kids" at a reduced rate which is sponsored by a nearby café, and in return the book as delivered may incorporate advertisements for the café. Or a user 102(1) may see an advertisement for tours of downtown Seattle.

Figure 11:
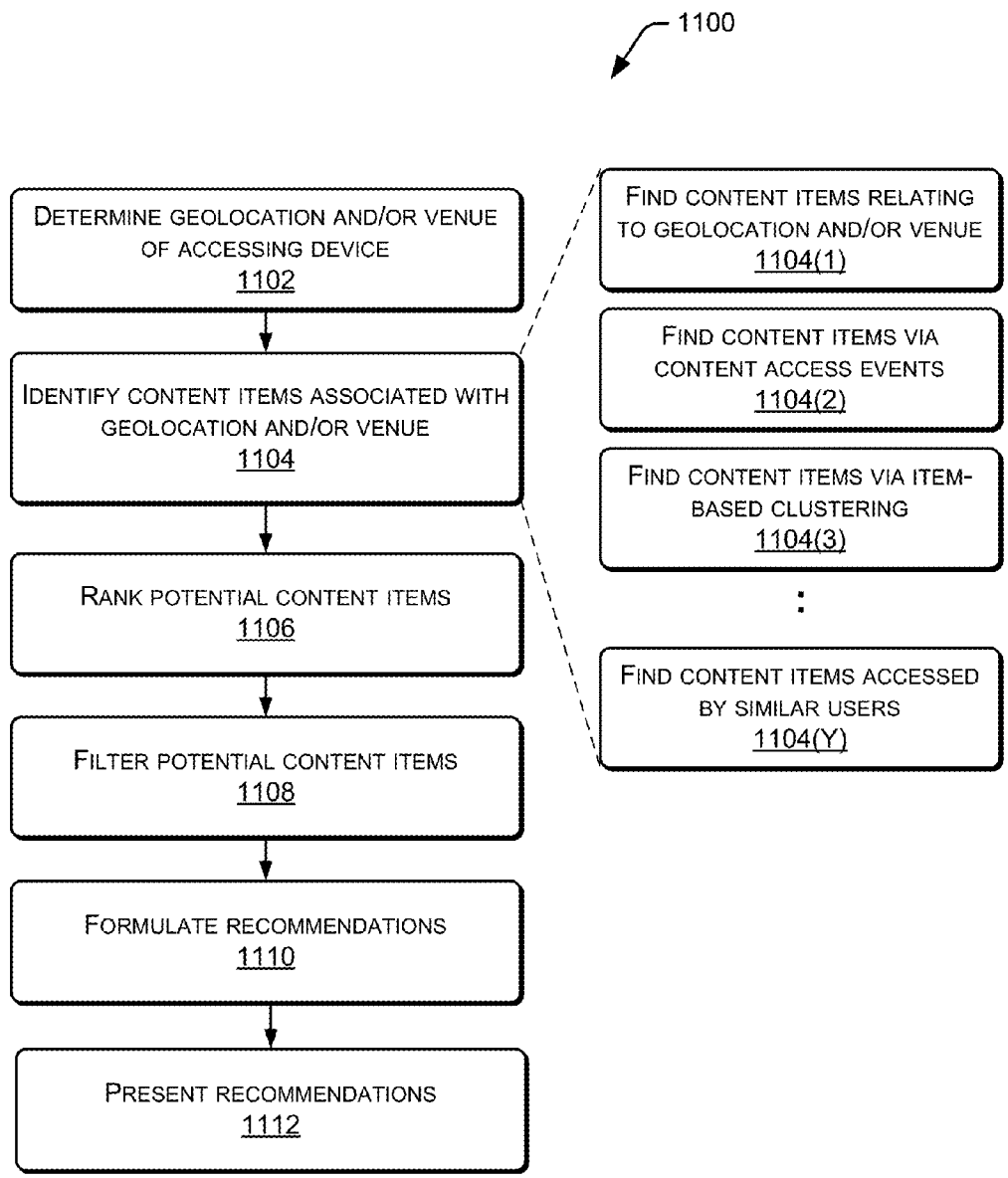
FIG. 11 is a flow diagram of an illustrative process of generating a recommendation based on geolocation and/or venue based on content access information generated from content access events gathered by access devices.

FIG. 11 shows an illustrative process 1100 of generating a recommendation based on location that may, but need not, be implemented using the architecture shown in FIGS. 1-10. The process 1100 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process will be described in the context of the architecture of FIGS. 1-10.

At 1102, the geolocation and/or venue of an access device 104 are determined. The location of the device 104 can be used as a proxy for the location of the user. As described above with respect to FIG. 8, geolocation may be determined by several mechanisms, including information queried from access device 104 or derived from content access events from access device 104. For example, DCRS 124 may query access device 104(1) to use onboard GPS 236 to find that the access device is currently at the geospatial coordinates latitude +47.619°, longitude −122.351°. Venue may be determined by the various mechanisms described above with reference to FIG. 9. For example, the user may input a venue identification code associated with the planetarium.

For this determination, parameters may be retrieved from a parameter database 314 (FIG. 7) and used to set thresholds or boundaries for the geolocation and venue determination mechanisms. For example, a content item such as "Clubs of the Seattle Underground" may have a parameter requiring use of local tokens to determine location such as geolocation or venue.

In another implementation, a prospective location may be used. For example, a user who is currently in Seattle may be planning a trip to Portland, Oreg. and wish to see recommended content items related to that geolocation. Or may wish to see recommended content items associated with community theater venues. In one implementation, this prospective location may be entered by the user. In another implementation, the prospective location may be derived automatically from another source, such as a travel itinerary associated with the user.

Another possible approach is to anticipate where users are likely to go next from a current location. Observing, in aggregate, where users who have accessed content items at one location tend to access content items at the next location. This information may be captured, for example, using a stochastic process, such as a Markov chain.

At 1104, content items associated with the geolocation and/or venue are identified. There are many different ways to identify content items, as represented by the various sub-processes 1104(1)-(Y). For instance, content items that have content relating to the geolocation or venue may be identified at 1104(1). A title, known topics, or other subject matter within the content items may be used to relate the content item to a location. Thus, the book "Seattle Sights" or a music collection "Early Sounds of Kurt Cobain" would be associated with the geolocation of Seattle.

At 1104(2), an association may be based on content access events captured by the access device. For example, content items accessed by other users while at the same or similar location/venue may be identified. For a user who is visiting the Seattle Science Center, content items accessed by other users who are, or were, at the Seattle Science Center may be identified. Further, in another scenario, content items accessed by neighbors residing in the same neighborhood may be identified as of interest to the user.

At 1104(3), item-based clustering techniques may be employed to identify content items related to a particular location or venue. In some situations, content items pertaining to a particular venue may be sparse. For instance, there may be very few content items pertaining to the planetarium in the Seattle Science Center, but there may be many more content items for the Center or for the whole tourist area surrounding the Space Needle in Seattle. In this case, the item-based clustering may expand to find content items related to larger venues that encompass or relate to the target venue.

Also, at 1104(Y), the content items may be identified based on other users, such as collections of users identified as being similar or individual users or user groups that a user chooses to follow. In one approach, sample users such as actual users (e.g., entities, individuals, automated processes, etc.), or synthesized composites (e.g., derived from a plurality of actual users) with a similarity to the accessing user are identified. Similarity may be determined by comparison of user access profiles and demographics that are within a threshold of the accessing user. For example, if the threshold is being within five years of the same educational level, a sample user with a Doctorate degree may be considered similar to an accessing user with a Masters degree but dissimilar to a user with an Associate's degree. In other implementations, similarity may be determined using characteristics such as age, location of residence, preferred genre, preferred complexity, and so on. Similar users may also be identified based on behaviors (what they accessed, abandoned, finished, etc.), histories (purchase, viewing, sampling, etc.), or people-based clustering techniques. Once sample users are identified, content items accessed by the sample users who are similar to the accessing user and which are associated with the location can be identified to form a set of potential content items.

At 1106, potential content items are ranked. Rankings may be based on any number of different parameters, such as relevance, distance, proximity, completion metrics, usage patterns, abandonment statistics, popularity, user reviews, user preference, user behavior, past viewing history, past purchase history, and so on. For example, content items that appear most relevant to the geolocation and/or venue are ranked higher than those that are less relevant. As another, content items which are more likely to be completed (or less frequently abandoned) may be ranked higher than those content items which are most likely not be completed (or more frequently abandoned).

At 1108, the set of potential content items may be filtered. Various filters may be optionally applied to narrow the list of potential content items. One filter may be based on the preferences of the accessing user. For example, the user access profile may indicate that a user does not prefer children's books, and so these would be removed from the set of potential content items (e.g., "Astronomy for Kids" would be removed). Another filter may be based on items already completed or purchased by the user. Still another filter may be to exclude items that have high abandonment metrics. The filters may be explicit, such as the user specifying preferences, or implied, such as inferred over time from past history (e.g., a user never buys a children's book even though such books are recommended).

At 1110, recommendations of certain content items may be formulated. The recommended content items are selected from the pool of items associated with the particular geo-location and/or venue (at 1104), and which are optionally ranked (at 1106) and filtered (at 1108). The recommendations may be for whole content items, portions of potential content items, or combinations of the two. For example, suppose the user 102(1) is currently located with his access device 104(1) at a geolocation of latitude +47.619°, longitude −122.351°, and altitude of 211 feet. The user has noted a preference for exercise and has avoided, in the past, suggestions to purchase children's books. With this set of constraints, the process 1100 may provide recommendations of the book titled "Walking Tours of Downtown Seattle," ranked higher than the books "Seattle Sights" and "101 Fun Things to Do in Seattle". Further, the process 1100 may recommend chapter 3 of the book "Pocket Planetarium" because it pertains to the planetarium at the Seattle Science Center, but not the book, "Astronomy for Kids".

At 1112, the recommendations are presented to the user. In one implementation, the DCRS 124 provides the recommendations over the network to the accessing device 104, where they are presented to the user on the display 106, as shown in FIG. 1. The recommendations may be visually organized according to the rankings applied at 1106.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    determining, by a computing device, a location of a first access device;
    identifying an electronic book (eBook) that has been accessed by a second access device while the second access device was at the location, the eBook comprising a first portion and a second portion, the first portion including geo-location content and the second portion including non-geolocation content;
    analyzing the first portion of the eBook to determine that the geo-location content of the eBook is geographically related to the location;
    analyzing the second portion of the eBook to determine that the non-geolocation content of the eBook is topically related to the location; and
    generating a recommendation of the eBook based at least in part on determining that the geo-location content of the eBook is geographically related to the location and determining that the non-geolocation content of the eBook is topically related to the location.

2. The method of claim 1, wherein the generating comprises generating the recommendation based at least in part on a similarity of the eBook to another eBook that has been accessed at the location.

3. The method of claim 1, further comprising sending the recommendation to the first access device.

4. The method of claim 1, wherein the determining comprises determining a geospatial location, a venue, or both of the first access device.

5. The method of claim 1, wherein the determining includes at least one of:
    querying a network service over which the first access device communicates;
    utilizing data from a global positioning system (GPS) associated with the first access device; or
    receiving input from the first access device that identifies the location of the first access device.

6. The method of claim 1, wherein the generating comprises generating the recommendation based at least in part on one or more content access events for the eBook.

7. The method of claim 1, further comprising determining a similarity of (i) a user access profile for a user associated with the first access device to (ii) a user access profile for a user associated with the second access device;
    wherein the generating comprises generating the recommendation based at least in part on the similarity.

8. The method of claim 1, further comprising determining a similarity of (i) demographics information for a user associated with the first access device to (ii) demographics information for a user associated with the second access device;
    wherein the generating comprises generating the recommendation based at least in part on the similarity.

9. One or more non-transitory computer-readable storage media storing computer-readable instructions that, when executed, instruct one or more processors to perform operations comprising:
    identifying a location of a first access device;
    determining a content item that has been accessed by a second access device while the second access device was at the location;

analyzing non-geolocation content of the content item to determine that at least a portion of the content item is topically related to the location; and sending a recommendation of the content item to the first access device.

10. The one or more non-transitory computer-readable storage media of claim 9, wherein the operations further comprise generating the recommendation based at least in part on a similarity of (i) a user access profile for a user associated with the first access device to (ii) a user access profile for a user associated with the second access device.

11. The one or more non-transitory computer-readable storage media of claim 9, wherein the operations further comprise generating the recommendation based at least in part on one or more content access events for the content item.

12. The one or more non-transitory computer-readable storage media of claim 9, wherein the identifying the location comprises identifying a current location of the first access device.

13. The one or more non-transitory computer-readable storage media of claim 9, wherein the identifying the location comprises identifying a neighborhood in which a user of the first access device resides.

14. A system comprising:
one or more processors;
memory communicatively coupled to the one or more processors;
a location module stored in the memory and executable by the one or more processors to identify a location of a first electronic access device; and
a recommendation module stored in the memory and executable by the one or more processors to:
identify a content item that has been accessed by a second electronic access device while the second electronic access device was at the location, the content item comprising a first portion and a second portion, the first portion indicating a geo-location and the second portion including non-geolocation content;
analyze the second portion of the content item to determine that the non-geolocation content is topically related to the location; and
generate, based at least in part on the determining that the non-geolocation content is topically related to the location, a recommendation of the content item.

15. The system of claim 14, wherein the location module comprises at least one of:
a geolocation determination module configured to determine a geolocation of the first electronic access device; or
a venue determination module configured to determine a venue of the first electronic access device.

16. The system of claim 14, wherein the location module is configured to determine a venue of the first electronic access device based on at least one of:
a token provided by a venue;
a venue identifier provided by a venue network;
a network identifier provided by a venue network;
a network address of a venue network;
a hardware address of an access point of a venue network; or
user input indicating a venue.

17. The system of claim 14, wherein the location module is configured to determine a geolocation of the first electronic access device based on at least one of:
a geolocation report from the first electronic access device;
a geolocation service provided by a network provider;
a network address of the first electronic access device; or
input received from the first electronic access device.

18. The system of claim 14, wherein the recommendation module is configured to generate the recommendation based at least in part on a similarity of the content item to another content item that has been accessed at the location.

19. The system of claim 14, wherein the recommendation module is configured to generate the recommendation based at least in part on a commonality of (i) a user access profile for a user associated with the first electronic access device and (ii) a user access profile for a user associated with the second electronic access device.

20. The system of claim 14, wherein the recommendation module is configured to generate the recommendation based at least in part on a commonality of (i) a profession of a user associated with the first electronic access device and a profession of a user associated with the second electronic access device, (ii) a purchase history of the user associated with the first electronic access device and a purchase history of the user associated with the second electronic access device, or (iii) both.

* * * * *